(12) United States Patent (10) Patent No.: US 9,050,766 B2
Walker (45) Date of Patent: Jun. 9, 2015

(54) VARIATIONS AND METHODS OF PRODUCING VENTILATED STRUCTURAL PANELS

(71) Applicant: James Walker, Franconia, NH (US)

(72) Inventor: James Walker, Franconia, NH (US)

(*) Notice: Subject to any disclaimer, the term of this patent is extended or adjusted under 35 U.S.C. 154(b) by 120 days.

(21) Appl. No.: 13/782,406

(22) Filed: Mar. 1, 2013

(65) Prior Publication Data

US 2014/0246146 A1 Sep. 4, 2014

(51) Int. Cl.

| B29C 47/00 | (2006.01) |
|---|---|
| B29D 24/00 | (2006.01) |
| B29D 28/00 | (2006.01) |
| E04C 2/36 | (2006.01) |
| E04C 2/34 | (2006.01) |

(52) U.S. Cl.
CPC ....... *B29D 24/002* (2013.01); *E04C 2002/3472* (2013.01); *E04C 2002/3488* (2013.01); *E04C 2/34* (2013.01); *B29D 28/00* (2013.01)

(58) Field of Classification Search
CPC ............... E04C 2002/3488; E04C 2002/3477; E04C 2002/3472; E04C 2/24; E04C 2/422; E04C 2/423; E04C 2/421
USPC ................ 264/113, 172.19, 173.1; 52/793.1, 52/793.11, 580, 581, 783.18, 790.1, 52/799.12

See application file for complete search history.

(56) References Cited

U.S. PATENT DOCUMENTS

| 1,086,031 A | 2/1914 | Davis |
| 1,154,254 A | 9/1915 | Lachman |
| 1,928,034 A | 9/1933 | Schulstadt |
| 1,943,080 A * | 1/1934 | Langston ................. 118/44 |
| 2,206,119 A | 7/1940 | Persons |
| 2,220,606 A | 11/1940 | Malarkey et al. |
| 2,706,164 A | 4/1955 | Hervey |
| 2,762,472 A | 9/1956 | Jackson |
| 2,960,146 A * | 11/1960 | Williams ................. 156/205 |
| 3,024,879 A | 3/1962 | Kandra |
| 3,082,504 A | 3/1963 | Tatsch |
| 3,085,292 A * | 4/1963 | Kindseth ................. 264/167 |
| 3,225,162 A | 12/1965 | Delafrange |
| 3,228,162 A | 1/1966 | Gregoire |
| 3,438,164 A | 4/1969 | Duepree |
| 3,496,052 A | 2/1970 | Oderthal |
| 3,516,347 A | 6/1970 | May |
| 3,537,378 A | 11/1970 | Daly |

(Continued)

FOREIGN PATENT DOCUMENTS

| FR | 918265 A * | 2/1947 |
| JP | 01218819 A * | 9/1989 |

(Continued)

OTHER PUBLICATIONS

Machine translation of French Patent Publication No. FR-918265A, originally published Feb. 1947, 10 pages.*

(Continued)

*Primary Examiner* — William Bell
(74) *Attorney, Agent, or Firm* — Davis & Bujold, P.L.L.C.; Michael J. Bujold

(57) ABSTRACT

A method of forming a ventilated structural panel having a top sheet, a bottom sheet, and a plurality of spacing structural elements arranged in a matrix that fixedly attach the top sheet to the bottom sheet, the method comprising forming the matrix in a mold form attaching the matrix to the first and the second sheet.

17 Claims, 34 Drawing Sheets

(56) References Cited

U.S. PATENT DOCUMENTS

| | | |
|---|---|---|
| 3,538,668 A | 11/1970 | Anderson |
| 3,623,936 A * | 11/1971 | Hotz .............................. 428/116 |
| 3,662,507 A | 5/1972 | Espeland |
| 3,797,180 A | 3/1974 | Grange |
| 3,807,116 A | 4/1974 | Flynn |
| 3,886,706 A | 6/1975 | Baker |
| 3,972,164 A | 8/1976 | Grange |
| 4,012,882 A | 3/1977 | Juriss et al. |
| 4,064,300 A | 12/1977 | Bhangu |
| 4,071,194 A | 1/1978 | Eckert et al. |
| 4,084,366 A | 4/1978 | Saylor et al. |
| 4,093,762 A | 6/1978 | Kiefer |
| 4,285,181 A | 8/1981 | Van Loghem et al. |
| 4,319,520 A | 3/1982 | Lanting et al. |
| 4,323,533 A * | 4/1982 | Bramhall ..................... 264/145 |
| 4,329,827 A | 5/1982 | Thorn |
| 4,344,266 A | 8/1982 | Gray |
| 4,348,442 A | 9/1982 | Figge |
| 4,573,304 A | 3/1986 | Mieyal |
| 4,635,419 A | 1/1987 | Forrest |
| 4,663,909 A | 5/1987 | Ogino et al. |
| 4,674,249 A | 6/1987 | Bennett, Jr. |
| 4,676,036 A | 6/1987 | Bessert |
| 4,707,393 A | 11/1987 | Vetter |
| 4,822,660 A | 4/1989 | Lipp |
| 4,850,166 A | 7/1989 | Taylor |
| 4,852,314 A | 8/1989 | Moore, Jr. |
| 4,860,506 A | 8/1989 | Yoshimi et al. |
| 4,888,927 A | 12/1989 | Yoshimi et al. |
| 4,894,974 A | 1/1990 | Mayhew et al. |
| RE33,220 E | 5/1990 | Collier |
| 4,937,122 A | 6/1990 | Talbert |
| 4,977,714 A | 12/1990 | Gregory, Jr. |
| 5,017,597 A | 5/1991 | Gillard et al. |
| 5,022,943 A | 6/1991 | Zaima |
| 5,071,688 A | 12/1991 | Hoffman |
| 5,098,762 A | 3/1992 | Nakajima |
| 5,099,627 A | 3/1992 | Coulton et al. |
| 5,157,892 A | 10/1992 | Ryther |
| 5,180,619 A | 1/1993 | Landi et al. |
| 5,204,127 A * | 4/1993 | Prusha .......................... 425/544 |
| 5,204,161 A | 4/1993 | Pettit et al. |
| 5,206,067 A | 4/1993 | Bonzo |
| 5,238,452 A | 8/1993 | Levy et al. |
| 5,277,953 A | 1/1994 | Tsuda |
| 5,299,401 A | 4/1994 | Shelton |
| 5,366,787 A | 11/1994 | Yasui et al. |
| 5,369,926 A | 12/1994 | Borland |
| 5,377,468 A | 1/1995 | Repasky |
| 5,396,750 A | 3/1995 | Kleyn |
| 5,399,406 A * | 3/1995 | Matsuo et al. .................. 428/57 |
| 5,433,050 A | 7/1995 | Wilson et al. |
| 5,467,609 A | 11/1995 | Feeney |
| 5,468,184 A | 11/1995 | Collier |
| 5,471,806 A | 12/1995 | Rokhlin |
| 5,473,847 A | 12/1995 | Crookston |
| 5,487,247 A | 1/1996 | Pigg |
| 5,487,930 A | 1/1996 | Lockshaw et al. |
| 5,493,839 A | 2/1996 | Sax et al. |
| 5,526,621 A | 6/1996 | Shelton |
| 5,526,625 A | 6/1996 | Emblin et al. |
| 5,527,588 A | 6/1996 | Camarda et al. |
| 5,543,198 A | 8/1996 | Wilson |
| 5,561,953 A | 10/1996 | Rotter |
| 5,561,958 A | 10/1996 | Clement et al. |
| 5,591,511 A | 1/1997 | Yasui |
| 5,633,053 A | 5/1997 | Lockshaw et al. |
| 5,634,315 A | 6/1997 | Toya |
| 5,640,812 A | 6/1997 | Crowley et al. |
| 5,670,220 A | 9/1997 | Skoien |
| 5,741,571 A | 4/1998 | Bowerman et al. |
| 5,761,864 A | 6/1998 | Nonoshita |
| 5,888,610 A | 3/1999 | Fournier et al. |
| 5,914,175 A | 6/1999 | Nudo et al. |
| 5,946,878 A * | 9/1999 | Grund et al. ..................... 52/630 |
| 5,957,506 A | 9/1999 | Stepp |
| 5,958,551 A | 9/1999 | Garcio-Ochoa |
| 6,017,597 A | 1/2000 | Minakami et al. |
| 6,101,768 A | 8/2000 | Springstead et al. |
| 6,122,892 A | 9/2000 | Gonidec et al. |
| 6,134,854 A | 10/2000 | Stanchfield |
| 6,171,680 B1 | 1/2001 | Fahmy |
| 6,185,895 B1 | 2/2001 | Rettew |
| 6,189,270 B1 | 2/2001 | Jeffers et al. |
| 6,209,273 B1 * | 4/2001 | Jeffers et al. .................. 52/220.7 |
| 6,210,774 B1 | 4/2001 | Garcia-Ochoa |
| 6,269,598 B1 | 8/2001 | Wintermantel |
| 6,279,279 B1 | 8/2001 | Larimore |
| 6,286,289 B1 | 9/2001 | Powell et al. |
| 6,415,580 B2 | 7/2002 | Ojala |
| 6,449,915 B1 | 9/2002 | Park |
| 6,457,288 B2 | 10/2002 | Zambelli et al. |
| 6,591,567 B2 | 7/2003 | Hota et al. |
| 6,594,964 B2 | 7/2003 | Charland |
| 6,598,366 B2 | 7/2003 | Hsieh et al. |
| 6,609,592 B2 | 8/2003 | Wilson |
| 6,668,504 B2 | 12/2003 | Hughart |
| 6,773,791 B1 * | 8/2004 | Ruggie et al. .................. 428/156 |
| 6,780,099 B1 | 8/2004 | Harper |
| 6,827,180 B2 | 12/2004 | Wilson |
| 6,852,386 B2 | 2/2005 | Nadezhdin et al. |
| 6,887,555 B2 | 5/2005 | Woo et al. |
| 7,090,911 B2 | 8/2006 | Lascelles |
| 7,131,242 B2 | 11/2006 | Martensson et al. |
| 7,134,250 B2 | 11/2006 | Forrester et al. |
| 7,147,741 B2 | 12/2006 | Sing |
| 7,150,133 B2 | 12/2006 | Regina et al. |
| 7,165,369 B2 | 1/2007 | Jandl |
| 7,185,947 B2 | 3/2007 | Boehm |
| 7,288,326 B2 | 10/2007 | Elzey et al. |
| 7,401,682 B2 | 7/2008 | Proscia et al. |
| D589,171 S | 3/2009 | Gleeson et al. |
| 7,536,835 B2 | 5/2009 | Schluter |
| 7,651,751 B2 | 1/2010 | Hasch et al. |
| 7,669,384 B2 | 3/2010 | Kaida et al. |
| 7,722,112 B2 | 5/2010 | Ehrlich |
| 7,743,884 B2 | 6/2010 | Thomas et al. |
| 7,766,280 B2 | 8/2010 | Cloft et al. |
| 7,810,296 B1 | 10/2010 | Turku |
| 7,911,075 B2 | 3/2011 | Pagliasotti |
| 7,922,954 B2 | 4/2011 | Marschke |
| 8,043,690 B2 | 10/2011 | Hand et al. |
| 8,046,969 B2 | 11/2011 | Dagher et al. |
| 8,051,613 B2 | 11/2011 | Lu et al. |
| 8,052,377 B2 | 11/2011 | Coney et al. |
| 8,100,341 B1 | 1/2012 | Roderick et al. |
| 8,106,612 B2 | 1/2012 | Harada et al. |
| 8,127,505 B2 | 3/2012 | Lu et al. |
| 8,141,313 B2 | 3/2012 | Dagher et al. |
| 8,176,635 B2 | 5/2012 | Queheillalt et al. |
| 8,192,570 B2 | 6/2012 | Hand et al. |
| 8,245,947 B2 | 8/2012 | Roderick et al. |
| 8,273,208 B2 | 9/2012 | Brinner |
| 8,287,984 B2 | 10/2012 | Grall |
| 8,343,398 B2 | 1/2013 | Khatchikian |
| 8,356,450 B2 | 1/2013 | Larimore |
| 8,387,315 B2 | 3/2013 | Hosking et al. |
| 8,393,129 B2 | 3/2013 | Arsene et al. |
| 8,407,965 B2 | 4/2013 | Dorozhkin et al. |
| 8,438,806 B2 | 5/2013 | Lim |
| 8,453,399 B2 | 6/2013 | Anderson |
| 8,459,597 B2 | 6/2013 | Cloft et al. |
| 8,464,831 B2 | 6/2013 | Olander Burak et al. |
| 8,490,355 B2 | 7/2013 | Walker |
| 8,512,853 B2 | 8/2013 | Chakrabarti |
| 8,528,184 B2 | 9/2013 | Holmes, IV et al. |
| 8,530,027 B2 | 9/2013 | Kozar et al. |
| 8,534,018 B2 | 9/2013 | Walker |
| 2003/0126806 A1 | 7/2003 | Ellis |
| 2003/0161994 A1 | 8/2003 | Je-Suk et al. |
| 2003/0167714 A1 | 9/2003 | Jandl |
| 2004/0101649 A1 | 5/2004 | Thoma |
| 2004/0112007 A1 | 6/2004 | Thibeau |
| 2004/0177590 A1 | 9/2004 | Nudo et al. |

(56) References Cited

U.S. PATENT DOCUMENTS

| | | |
|---|---|---|
| 2004/0197519 A1 | 10/2004 | Elzey et al. |
| 2004/0226238 A1 | 11/2004 | Haapiainen |
| 2005/0053515 A1 | 3/2005 | Yates et al. |
| 2005/0066619 A1 | 3/2005 | McDonald |
| 2005/0072097 A1 | 4/2005 | Holloway |
| 2005/0144906 A1 | 7/2005 | Morris et al. |
| 2005/0204695 A1 | 9/2005 | Blazevic |
| 2006/0005509 A1 | 1/2006 | Yohnke et al. |
| 2006/0083894 A1 | 4/2006 | Vetrovec et al. |
| 2006/0131933 A1 | 6/2006 | Boehm |
| 2006/0144013 A1 | 7/2006 | Rouanet et al. |
| 2006/0218869 A1 | 10/2006 | Ellis |
| 2006/0242920 A1 | 11/2006 | Griffner |
| 2006/0248855 A1 | 11/2006 | Olvey |
| 2006/0260265 A1 | 11/2006 | Zatkulak |
| 2006/0266001 A1 | 11/2006 | Barker et al. |
| 2007/0034446 A1 | 2/2007 | Proscia et al. |
| 2007/0095016 A1 | 5/2007 | Sakae |
| 2007/0141304 A1 | 6/2007 | Agrawal |
| 2007/0169432 A1 | 7/2007 | Bridge |
| 2007/0204541 A1 | 9/2007 | Sade |
| 2007/0209318 A1 | 9/2007 | McCarthy |
| 2007/0266494 A1 | 11/2007 | DeLuca et al. |
| 2007/0283639 A1 | 12/2007 | Kortuem et al. |
| 2008/0028704 A1 | 2/2008 | Cooper et al. |
| 2008/0034690 A1 | 2/2008 | Gartz et al. |
| 2008/0163582 A1 | 7/2008 | Trevethick |
| 2008/0202066 A1 | 8/2008 | Arsene et al. |
| 2009/0009083 A1 | 1/2009 | Park et al. |
| 2009/0038262 A1 | 2/2009 | Marschke |
| 2009/0044484 A1 | 2/2009 | Berger |
| 2009/0090083 A1 | 4/2009 | Dagher et al. |
| 2009/0183450 A1 | 7/2009 | Lu et al. |
| 2009/0277113 A1 | 11/2009 | Taraba et al. |
| 2010/0101171 A1 | 4/2010 | Clifton et al. |
| 2010/0120347 A1 | 5/2010 | Gehring et al. |
| 2010/0146884 A1 | 6/2010 | Lu et al. |
| 2010/0147499 A1 | 6/2010 | Arai et al. |
| 2010/0178157 A1 | 7/2010 | Arai et al. |
| 2010/0186305 A1 | 7/2010 | Larimore |
| 2010/0189953 A1 | 7/2010 | Lim |
| 2010/0257795 A1 | 10/2010 | Pagliasotti |
| 2010/0279065 A1 | 11/2010 | Schroer et al. |
| 2010/0300026 A1 | 12/2010 | Candiracci |
| 2010/0300645 A1 | 12/2010 | Glover |
| 2010/0325990 A1 | 12/2010 | Taraba et al. |
| 2010/0325991 A1 | 12/2010 | Trower et al. |
| 2011/0030300 A1 | 2/2011 | Liu |
| 2011/0047932 A1 | 3/2011 | Fleming, III |
| 2011/0072746 A1 | 3/2011 | Dagher et al. |
| 2011/0162299 A1 | 7/2011 | Azzolini |
| 2011/0265407 A1 | 11/2011 | Bryson |
| 2011/0272034 A1 | 11/2011 | Fex, Jr. |
| 2012/0017525 A1 | 1/2012 | Knapp et al. |
| 2012/0047839 A1 | 3/2012 | Walker |
| 2012/0047844 A1 | 3/2012 | Walker |
| 2012/0090265 A1 | 4/2012 | McCarville et al. |
| 2012/0149291 A1 | 6/2012 | Roderick et al. |
| 2012/0159877 A1* | 6/2012 | Reid ........................... 52/173.1 |
| 2012/0174518 A1 | 7/2012 | Litaize |
| 2012/0186184 A1 | 7/2012 | Mencio |
| 2012/0285116 A1 | 11/2012 | Walker |
| 2013/0025220 A1 | 1/2013 | Yu et al. |
| 2013/0036692 A1 | 2/2013 | Aspenson et al. |
| 2013/0084424 A1 | 4/2013 | Cangiano et al. |
| 2013/0091792 A1 | 4/2013 | Fujimoto |
| 2013/0125487 A1 | 5/2013 | Power et al. |
| 2013/0145714 A1 | 6/2013 | Walker |
| 2013/0230690 A1 | 9/2013 | Chakrabarti |

FOREIGN PATENT DOCUMENTS

| | | |
|---|---|---|
| JP | 08183046 A * | 7/1996 |
| JP | H1144011 A | 2/1999 |
| JP | 2006-007694 A | 1/2006 |
| SU | 941512 A1 | 7/1982 |
| SU | 1308727 A1 | 5/1987 |
| WO | 2011/039439 A1 | 4/2011 |
| WO | 2012/027353 A2 | 3/2012 |
| WO | 2012/027353 A3 | 3/2012 |

OTHER PUBLICATIONS http://www.hpanels.com/images/stories/pdfs/lit_prod_color/english/Cool-Vent.pdf [Available at least as early as Feb. 2013].

http://www.cornellcorporation.com/products/cvrs.htm [Available at least as early as Feb. 2013].

* cited by examiner

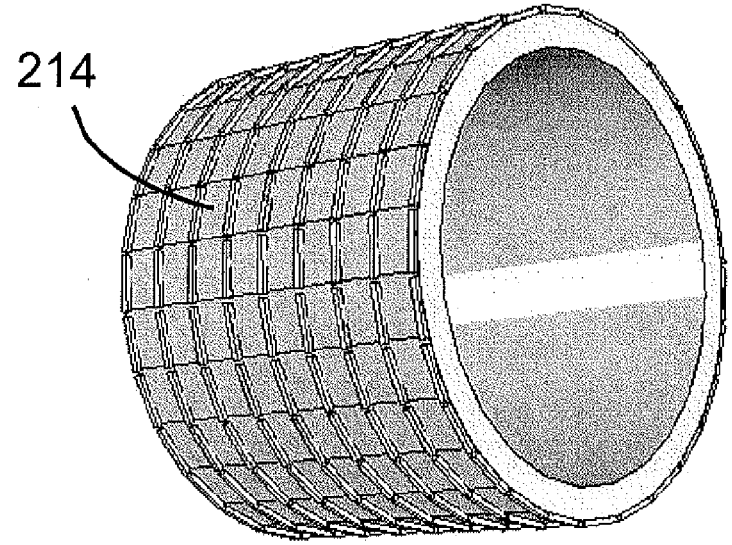
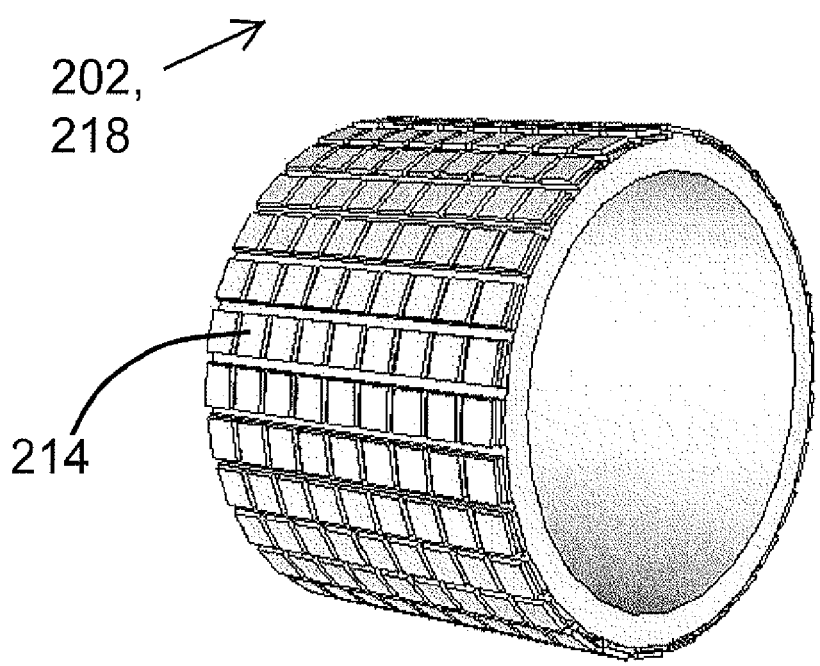
Fig. 21

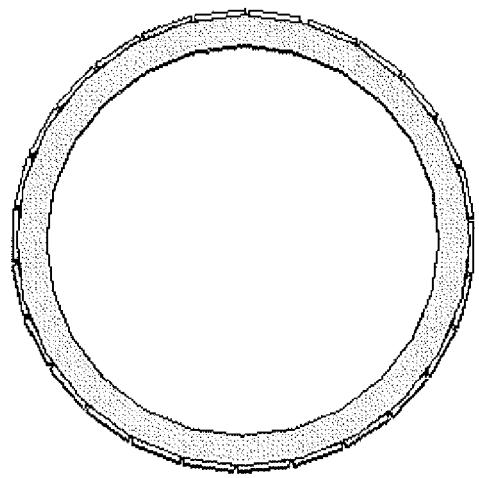
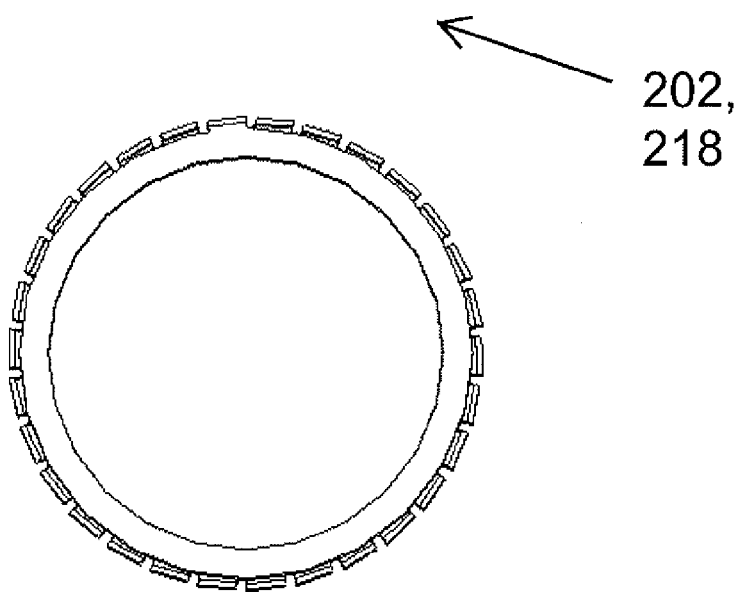
Fig. 25
202, 218

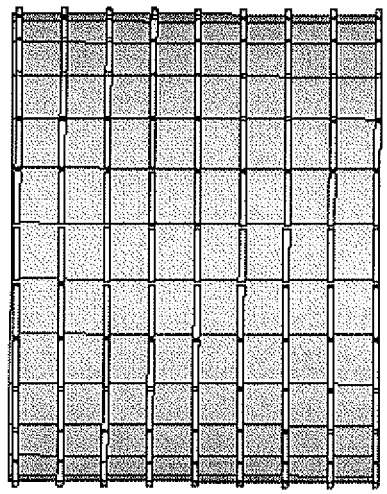
Fig. 26
202, 218
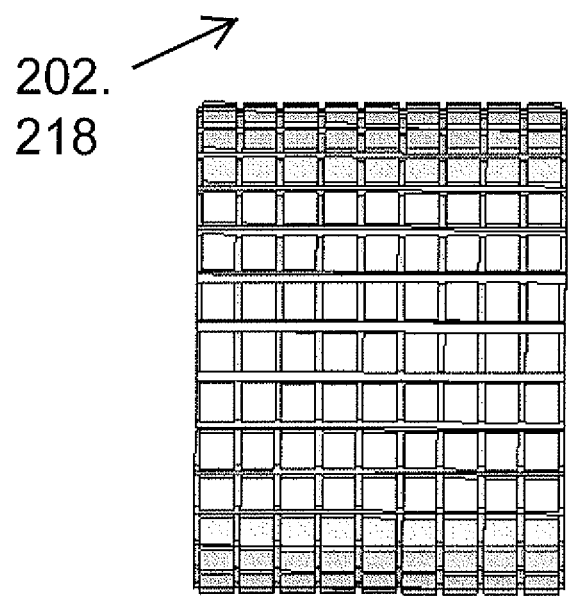

202, 228

202, 232

202, 232

17

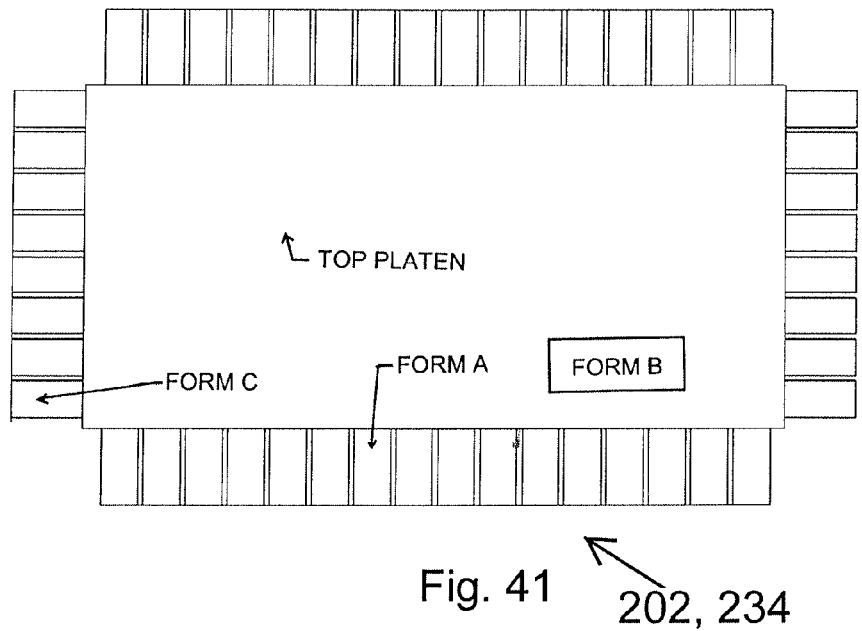
Fig. 41   202, 234
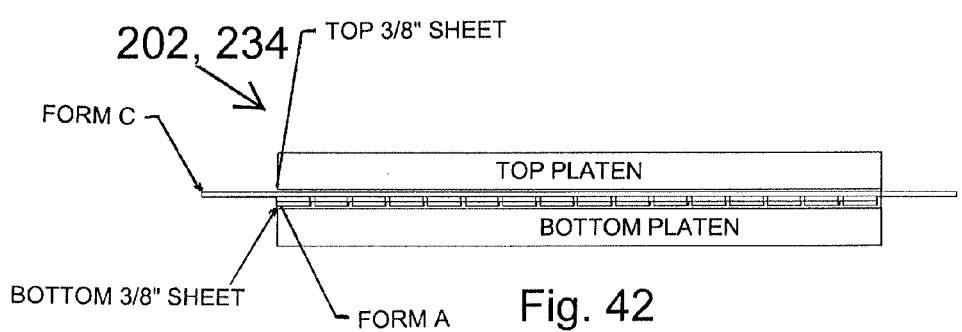
Fig. 42

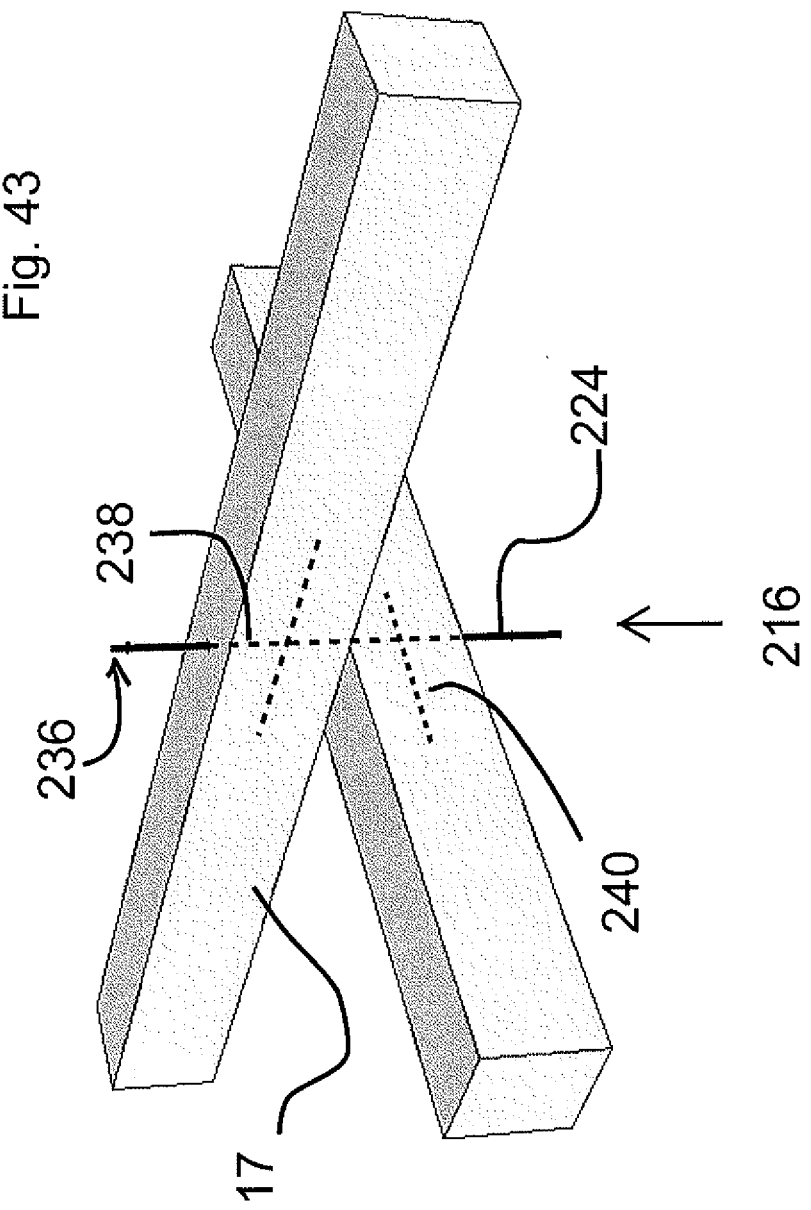

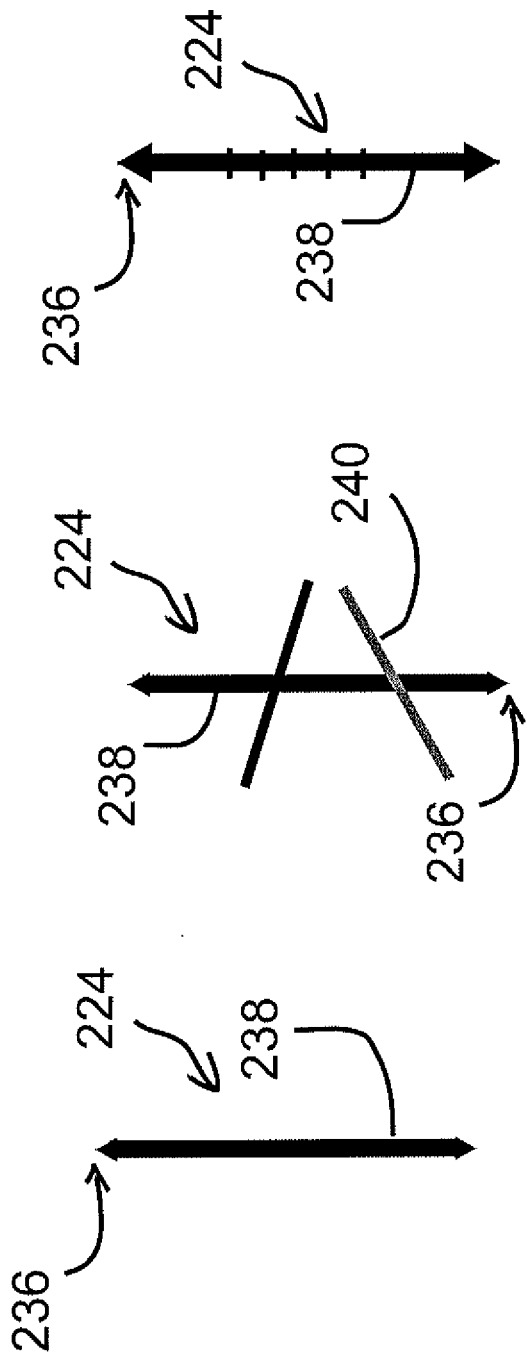

VARIATIONS AND METHODS OF PRODUCING VENTILATED STRUCTURAL PANELS

BACKGROUND OF THE INVENTION

The present invention relates to various embodiments of ventilated structural panels and methods of building the ventilated structural panels. Sheathing is an essential component of any residential or commercial structure and provides structural support for roofs, walls and floors, as well as providing a surface of sufficient thickness and strength for the attachment of roofing materials such as asphalt shingles and metal roofing, siding materials such as wood clapboards or vinyl siding and flooring finishes such as tile, wood, hardwood, laminates, vinyls or carpets and the like.

Sheathing has traditionally been supplied in 4'×8' sheets, made of plywood or OSB, which provide a desirable modular size that can be handled by one worker. The means of attachment depends on the function, thickness and strength requirements of the application and may include mechanical fasteners such as nails or staples and/or adhesives. Roofs, walls, and flooring use sheets of similar sizes, though varied thickness.

Complex, costly, and non-commercially feasible systems have been proposed to incorporate in some manner ventilation systems into sheathing, but they lack the structural strength and other benefits of the present invention.

SUMMARY OF THE INVENTION

Wherefore, it is an object of the present invention to overcome the above mentioned shortcomings and drawbacks associated with the prior art.

The methods and embodiments described within provide efficient methods of providing a matrix of elements arranged in a grid pattern with one layer of parallel members in a plane perpendicular and attached to a parallel plane of similar parallel members.

The matrix of parallel members in adjacent and perpendicular planes are disclosed as a component of different embodiment of the ventilated structural panels disclosed in U.S. patent application Ser. No. 13/539,919 filed Jul. 2, 2012, U.S. patent application Ser. No. 12/987,832, filed on Jan. 10, 2011, and U.S. patent application Ser. No. 13/016,320, filed Jan. 28, 2011. The disclosures of these three Applications are incorporated by reference as if fully restated herein.

The matrix members can be made of a matrix forms 202ing material that has a wood base, including, but not limited to oriented strand board, chips, fibers, cooked fibers, lignocellulose, cellulose particles and fibers as well as manmade fibers including, but not limited to fiberglass, other polymers and plastic based fibers, metal fibers, and carbon fibers. In all cases, an appropriate binding agent is combined with the fibers in a an optimal ratio with the fibers which when cured or hardened form a strong structural member capable of transferring tensile, compressive, bending and shear forces and stresses.

The matrix material can consist of the materials cited above separately or a combination of the materials above—for instance, lignocellulose or cellulose fibers themselves may have insufficient shear strength and the filler material strength could be increased with the addition of stronger fibers such as metal, fiberglass and carbon fiber among others, or even granular fill or epoxy or plastic. This mixture would also be more cost effective than using costly fibers exclusively.

The matrix assembly of individual "sticks" of material (usually wood, but can be other materials) with adhesive and/or mechanical means is an adequate but could be a slower production method for the ventilated structural panels, and are less likely to yield the precision provided by the presently disclosed methods.

The disclosed methods provide a number of alternatives for forming the matrix including:

A form comprising two machined presses to produce the matrix from fiber/binder material. This form could be used for non-compressible fillers by the bottom form to the desired thickness and lowering the top form;

The two machined presses could also be used for compressible filler material by filling to the top, screeding the top and pressing the top form to the desired thickness;

A similar method as above can also be employed on rotary forms or drums for continuous production for both compressible and non compressible filler;

Another method is disclosed for non-compressible filler where a form with top and bottom plates are placed together and voids in the top and bottom plates are filled via tubes which supply material at the intersections of the matrix members;

A similar method for non-compressible filler can also be employed for continuous production on rotary drums as shown in another embodiment;

Finally, a method is disclosed where the entire single or multi-plenum ventilated structural panel can be constructed with fibrous material and binder, in a single step, including both the top and bottom sheets and the integral matrix. This method involves forms which would be folded into a progressive assembly and withdrawn linearly when cured. The end result is a fully formed ventilated structural panel.

An example of typical production setups are provided below.

In all cases, the forms can be scalable and not necessarily limited to the common size of 4'×8' sheets. For the forms, either flat or rotary, they could have a circumference of 8', 16' or more—they could have a length of 8', 16' 24' or longer. All methods are fully scalable.

It is assumed that all elements and forms can be heated to provide the necessary heat energy to set heat activated binders. Similarly, all forms could have perforations for the introduction of steam or cooling air as required in the process depending on the fibrous material and binder.

The molds/dies are preferably constructed of metal but could be constructed from other durable materials including plastics and carbon fiber.

In all cases, the details of the forms and surfaces shall be assumed to be able to be formed with slight inclination for product removal. For production efficiencies, corners and edges could be chamfered with straight or curved edges, either in the molding or in a separate step.

The ventilated structural panel, as disclosed, is a versatile construction sheathing product that can be used in a wide variety of residential and commercial applications.

The ventilated structural panel is an ideal roof sheathing with superior strength and integral ventilation.

The ventilated structural panel is also an ideal ceiling sheathing for indoor use because of its superior strength and ability to span 48" or more which would eliminate required structure such as rafters. In this embodiment or application, the sheet of the ventilated structural panel exposed to the room, or one side of the sheet which would be exposed, could be constructed from drywall, preferably ¼" thick board to minimize weight. Similar other desirable materials could also be used for the exposed sheet such as wood paneling, vinyl coated sheets, plastic coated sheets or other desirable material. The structural spacing elements could be any of the embodiments of structural spacing elements previously disclosed.

Continuing in the same enhancement, The ventilated structural panel can be constructed not only of a variety of materials for or on one or both sheets, but can also come pre-finished in a desired color or finish with paint, vinyl applications or other veneers such as wood or plastics, especially for an exposed side of the sheet that faces the interior of the building. The sheets could also have various textures—wood could be smooth, rough, stained, painted, grooved or textured in a variety of ways. The sheets could be covered with cloth or papers for desired finishes.

The ventilated structural panel is an ideal siding material and provides a ventilated cavity behind the siding which is required by Code in some jurisdictions like Canada. The ventilated structural panel siding allows the siding to be nailed in any location without consideration of stud locations. A permeable but waterproof membrane can be incorporated into the construction of the ventilated structural panel to comply with code requirements if needed. Siding applications could utilize some of the ventilated structural panel configurations where there is a one layer matrix and/or the matrix is of one layer of an extruded or non/rectangular shape.

The ventilated structural panel is also an ideal flooring material that provides long spans between supports and a cavity between floors. This cavity can be used for air distribution for a forced air heating or cooling system allowing the placement of outlet registers at any location. Return air could be handled conventionally with ductwork. The ventilated structural panel would be sized accordingly with the requirements of the desired floor covering—for instance a tile floor may require a ventilated structural panel top sheet of ¾" while a carpeted or laminated floor may only require a ⅜" or ½" sheet. The lower sheet of the ventilated structural panel could be thinner, for example, ¼" thick.

The ventilated structural panel is an ideal flooring material to run electrical wires and voice and data wires when the ventilated structural panel is constructed with a screen which is located between the two layers of the matrix. The screen would still allow the required adhesive between adjacent members, but would separate the two cavities allowing wires to be run in one direction in one or more channels defined by a first layer of members, and/or in a second perpendicular direction in one or more perpendicular extending channels defined by a second layer of members. Exits and receptacles can be cut in the sheets where required.

The ventilated structural panel can be used for partitions between rooms by installing panels in a vertical orientation. The ventilated structural panel would provide two layers of sheeting that could be finished, for example, as disclosed above, and manufactured from wood such as OSB, plywood, or paneling or could be of 2 layers of drywall. This would allow the installation of the vertically oriented ventilated structural panel strength, structure, and both wall finishes in a single instillation step. The vertically oriented ventilated structural panels would preferably be interlocking with adjacent vertically oriented ventilated structural panels. This would greatly reduce the construction time required as opposed to conventional method of framing and then later finishing by applying drywall to each side of the framed wall. The vertically oriented ventilated structural panels would be especially useful in manufactured housing.

Multi-plenum ventilated structural panels would also be an ideal material for constructing walls for both exterior and interior applications. The dual cavities in multi-plenum ventilated structural panels would allow one cavity or both to be filled with insulation for sound proofing or thermal requirements. Partitions or walls of multi-plenum ventilated structural panels can be sized with the required sheet thickness to meet structural requirements for shear and bearing walls as required. The exterior sheets could be constructed from drywall while the interior sheet would supply the structural support if constructed from plywood, OSB or more advanced material such as carbon fiber panels, plastic panels, or metal panels. Alternatively, a carbon fiber, plastic, and/or metal reinforcement/cage/web or impregnation could be attached to or integrated in the interior sheet made from plywood or OSB. A strong configuration would be a multi plenum panel with a matrix in each plenum.

The ventilated structural panel or multi-plenum ventilated structural panels could be applied and used directly as roof panels if the top layer was constructed of a waterproof material such as metal, plastics, carbon fiber or other similar waterproof material. Preferably, where two panels are adjacent to one another, they would be waterproofed along their points of adjacency. This would further minimize installation time of a roof by obviating the need for the additional steps of applying roofing felt and shingles.

The ventilated structural panel or multi-plenum ventilated structural panels would be ideal materials to use to finish a concrete basement wall, especially if the plenum in the wall were tied to a plenum in the floorings that is also constructed of ventilated structural panel or multi-plenum ventilated structural panel. The plenum(s) in the panel would provide a void to help with thermal bridging and evacuate any moisture from leaks or condensation. The surface of the sheet facing the interior of the basement could be finished with a conventional material or the interior facing sheet have applied to or be comprised of drywall or other desirable pre-finished material such as vinyl laminates, paneling or wood, textured, painted, stained or otherwise finished.

The ventilated structural panels or multi-plenum ventilated structural panels are ideal for flooring in computer rooms, Information Technology rooms, and communication rooms. The panels provide both a plenum for cooled air and also channels for running wires and cables.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which:

FIG. 21 is a horizontal perspective view of the form of FIG. 20, with the top and bottom rotary plates separated to show detail;

FIG. 25 is a side plan view of the form of FIG. 20, with the top and bottom rotary plates separated to show detail;

FIG. 26 is a front plan view of the form of FIG. 20, with the top and bottom rotary plates separated to show detail;

FIG. 41 is a top plan view of the form of FIG. 37;

FIG. 42 is a side plan view of the long side of the form of FIG. 37;

FIG. 43 is a partial schematic iso view of an embedded mechanical fastener; and

FIGS. 44-46 are various embodiments of mechanical fasteners.

DETAILED DESCRIPTION OF THE INVENTION

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
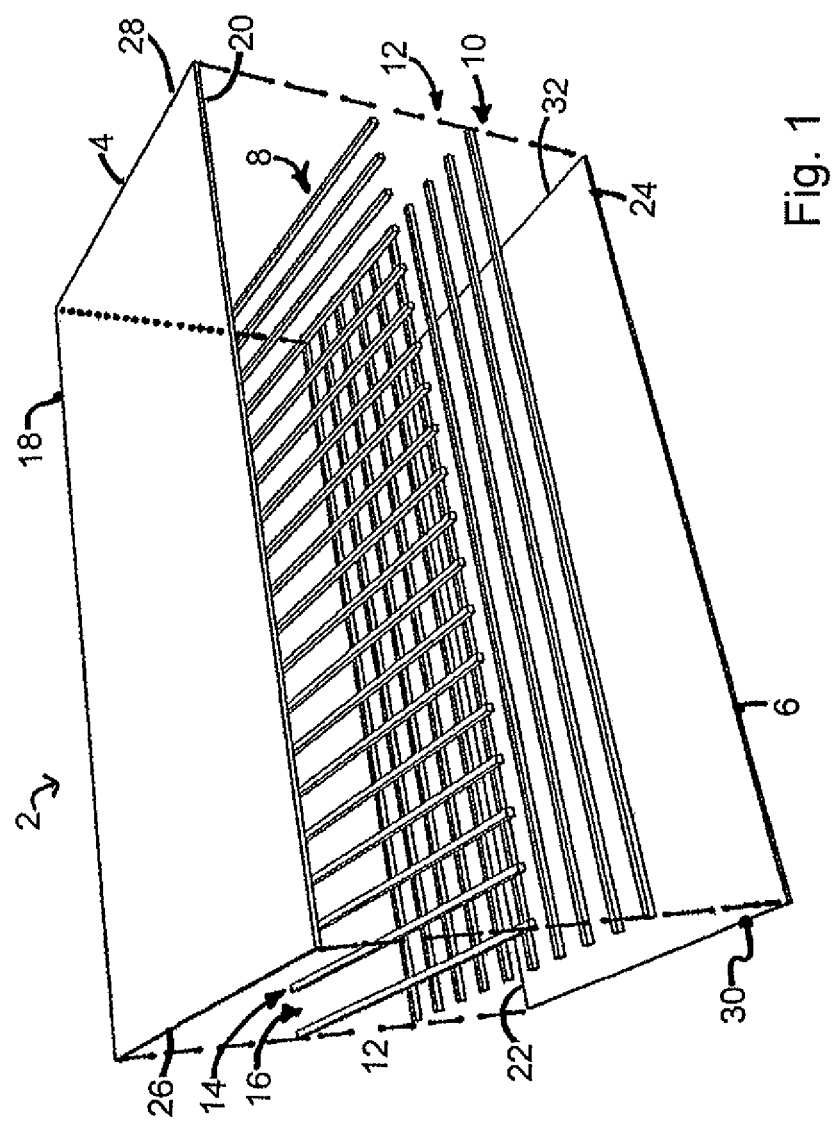
FIG. 1 is an exploded perspective view of an embodiment of the panel according to the presently claimed invention.
Figure 2:
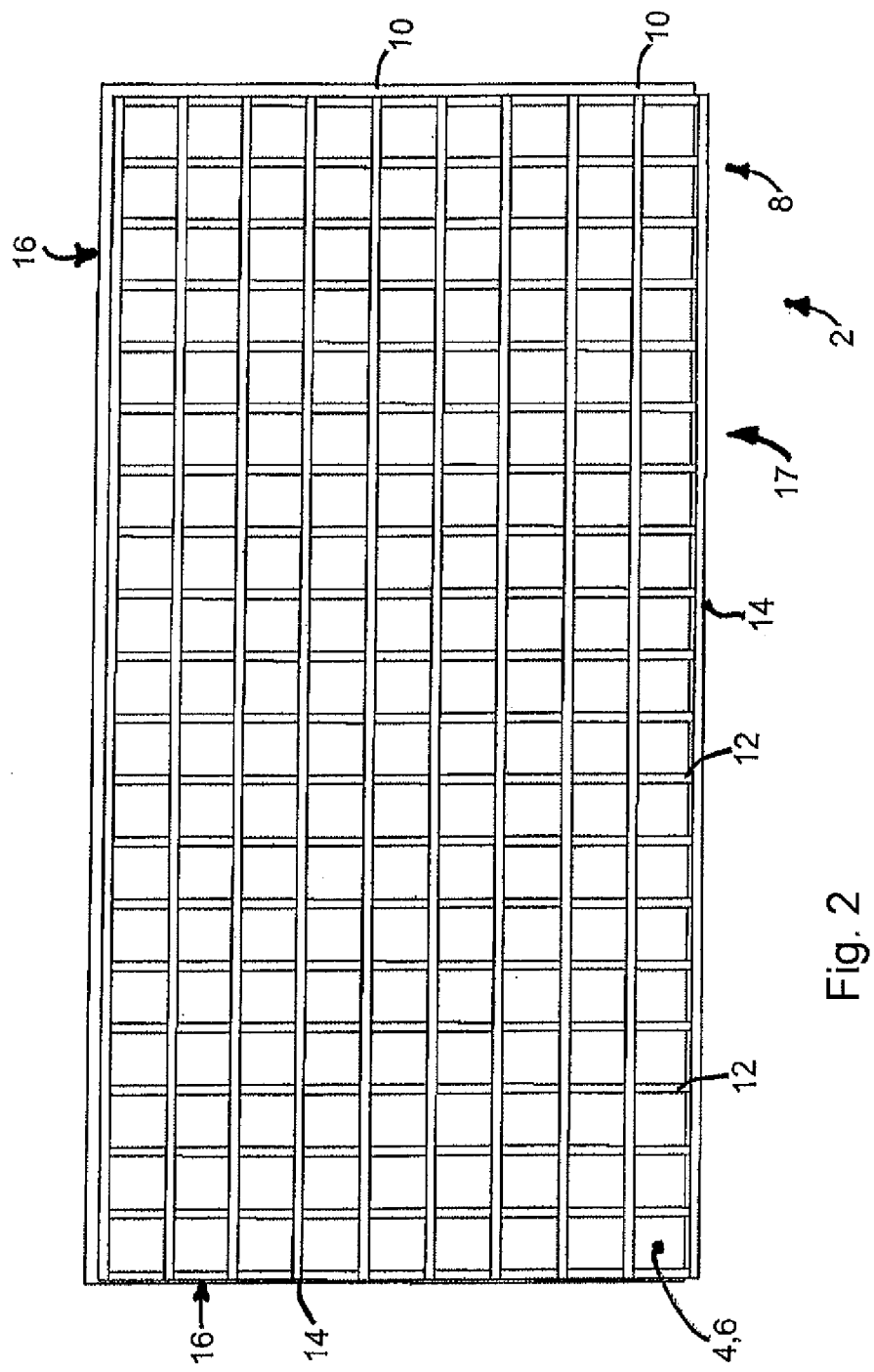
FIG. 2 is plan view of an embodiment of the panel.

Turning now to FIGS. 1-5, a brief description concerning the various components of the ventilated structural panel will now be briefly discussed. As can be seen in FIGS. 1 and 2, the panel 2 is comprised of a first sheet 4 and a second sheet 6 fixedly mated together via spacing structural elements 8. In one embodiment the spacing structural elements 8 are comprised of a first layer 10 and a second layer 12 of rectangular shaped elongated members 14, spaced apart from each other a predetermined spacing distance 16. The arrangement of elongated members 14 in the first layer 10 is perpendicular to the arrangement of elongated members 14 in the second layer 12, forming a matrix 17 of elongated members 14.

As shown in FIG. 1, a first horizontal edge 18 and a second horizontal edge 20 of the first sheet 4 substantially align with a first horizontal edge 22 and a second horizontal edge 24 of the second sheet 6, respectfully. Similarly, a first vertical edge 26 and a second vertical edge 28 of the first sheet substantially align with a first vertical edge 30 and a second vertical edge 32 of the second sheet 6, respectfully. For sake of clarity, the second sheet 6, though present each embodiment depicted, is not shown in FIGS. 2 and 3.

Figure 3:
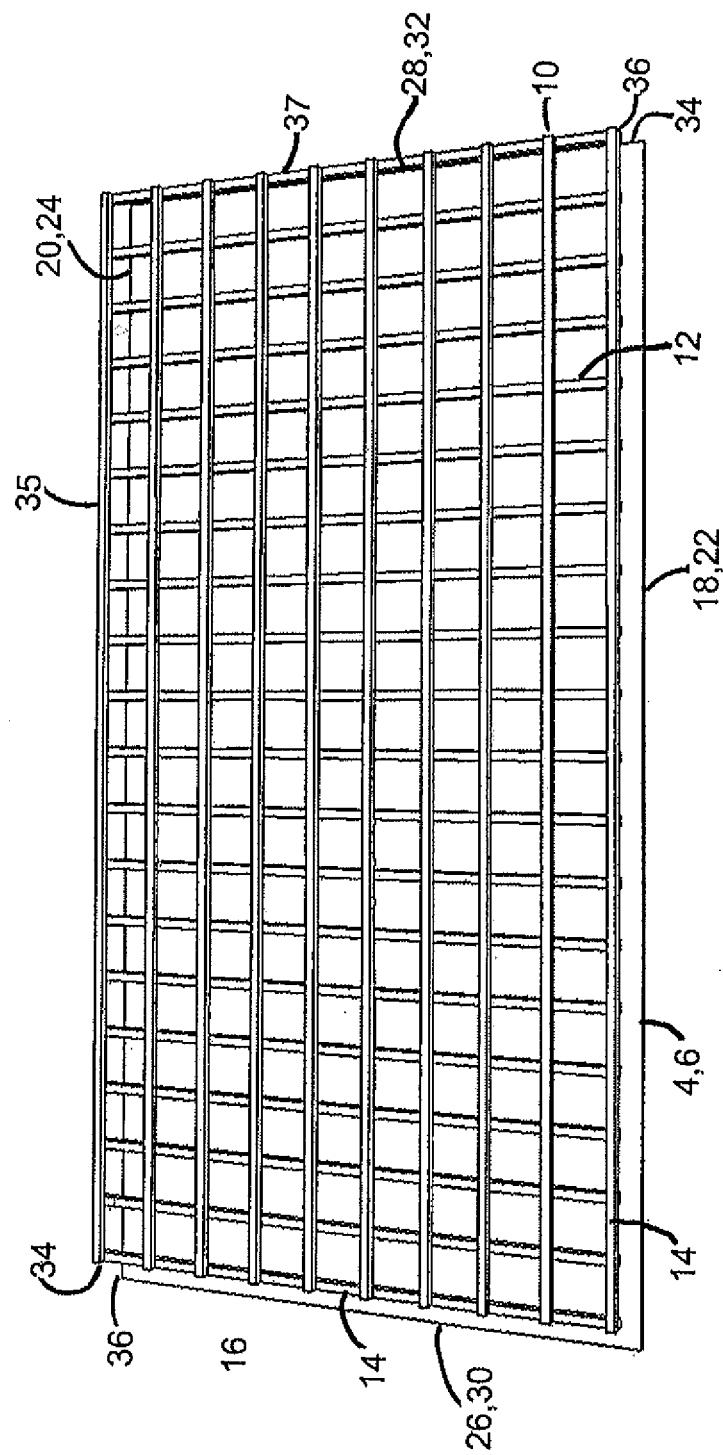
FIG. 3 is a plan view of an embodiment of the panel depicting indented space and protruding segments.

As shown in FIG. 3, the first 10 and the second layer 12 of elongated members 14 are indented a certain first distance 34 inward from the first horizontal edges 18, 22 of the first and the second sheet 4, 6. The first 10 and the second layer 12 of elongated members 14 correspondingly overlap the second horizontal edges 20, 24 of the first and the second sheet 4, 6 by the same first distance 34, creating first protruding segments 35. Similarly, the first 10 and the second layer 12 of elongated members 14 are indented a certain second distance 36 inward from the first vertical edges 26, 30 of the first and the second sheet 4, 6. Likewise, the first 10 and the second layer 12 of elongated members 14 correspondingly overlap the second vertical edges 28, 32 of the first and the second sheet 4, 6 by the same second distance 36, creating second protruding segments 37.

These matching indents and overlaps aid in fittingly mating a first panel 2 to a neighboring second panel 2 in a secure "tongue in grove" fashion. By providing corresponding indent and overlap on all four edges, a surface formed of multiple panels may be assembled faster, have increased strength and rigidity as a unit, and helps ensure a continued smooth panel surface. As in the embodiment shown, the first distance 34 of indent and overlap with respect to the horizontal edges can be of the same value as the second distance 36 of indent and overlap in the horizontal direction. It is to be noted that the indent and overlap have been exaggerated in FIG. 3, to show detail.

Figure 4:
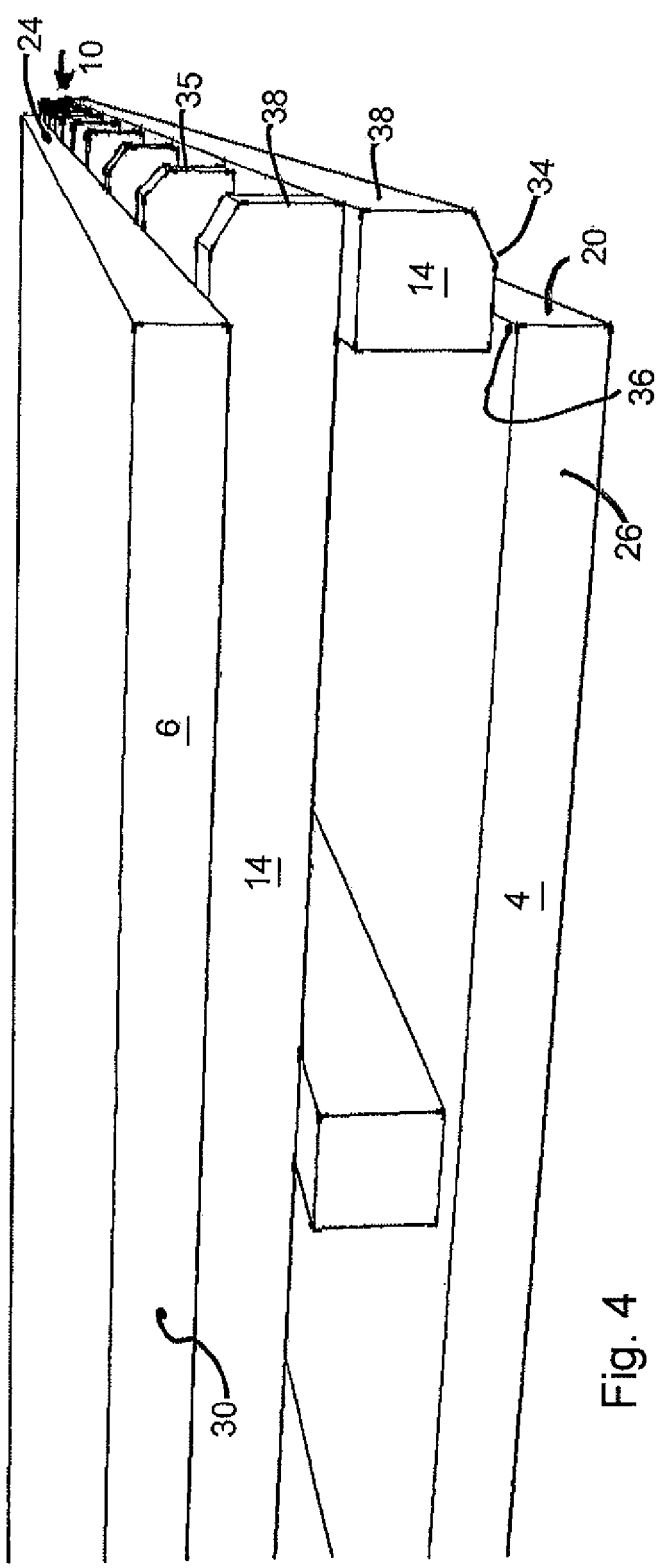
FIG. 4 is a close-up perspective view of an embodiment of the panel, depicting the indented space, protruding segments, and chamfered edges.

As shown in FIG. 4, a portion of the first protruding segments 35 that overlap the second horizontal edges 20, 24 of the first and the second sheet 4, 6, have a chamfered edge 38. These chamfered edges facilitate inserting the first protruding segments 35 of the first 10 and the second layer 12 of a first panel 2 into a second adjacent panel 2, and specifically into a space provided by the inward indent of the elongated members 14 the first distance 34 from first horizontal edges 18, 22 of the first 10 and the second layer 12 of the adjacent panel. The chamfer on the chamfered edge 38 would terminate between ⅛" and ⅜" from the second horizontal edges 20, 24 of the first and the second sheet 4, 6, and preferably would terminate approximately ¼" from the second horizontal edges 20, 24 of the first and the second sheet 4, 6.

In a like manner a portion of the second protruding segments 37 that overlap the second vertical edges 28, 32 of the first and the second sheet 4, 6, have a chamfered edge 38 [not shown]. These chamfered edges similarly facilitate inserting the second protruding segments 37 of the first 10 and the second layer 12 of a first panel 2 into a second adjacent panel 2, and specifically into the space provided by the inward indent of the elongated members 14 the second distance 36 from the first vertical edges 26, 30 of the first 10 and the second layer 12 of the adjacent panel. The chamfer on the chamfered edge 38 would terminate between ⅛" and ⅜" from the second vertical edges 28, 32 of the first and the second sheet 4, 6, and preferably would terminate approximately ¼" from the second vertical edges 28, 32 of the first and the second sheet 4, 6.

Figure 5:
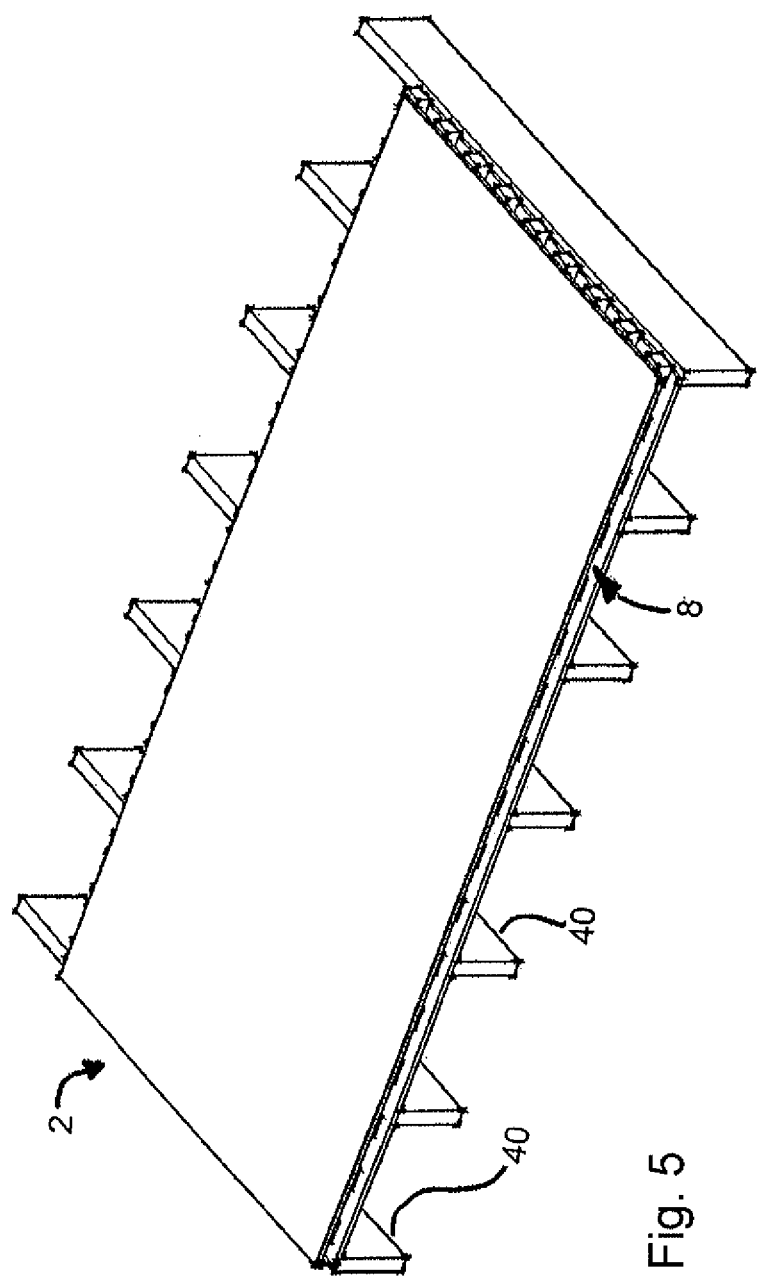
FIG. 5 is an iso view of the panel mounted on mounting elements.
Figure 6:
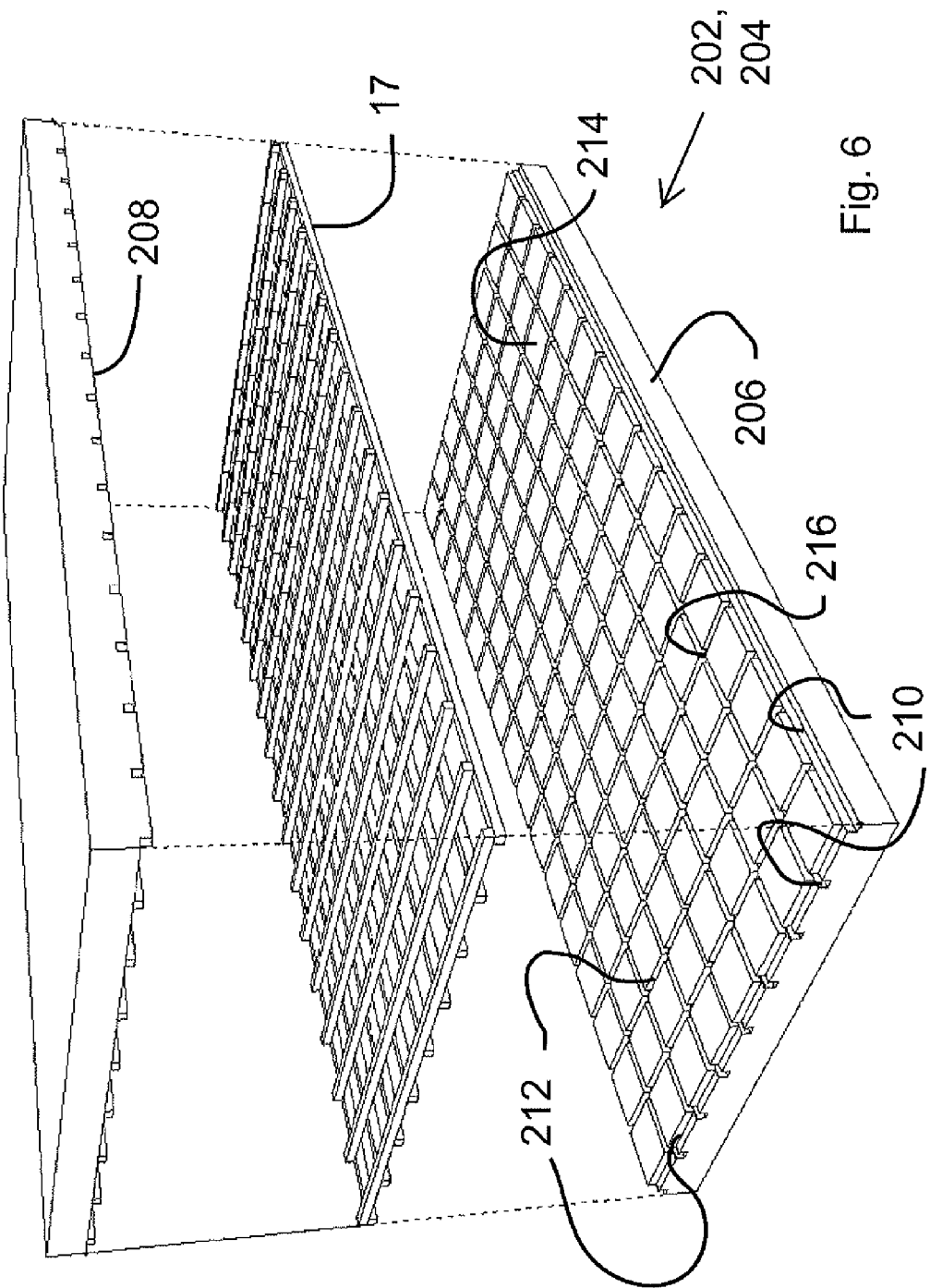
FIG. 6 is a perspective top front view of a 48"×96" planar press form with a wood matrix in the middle.
Figure 7:
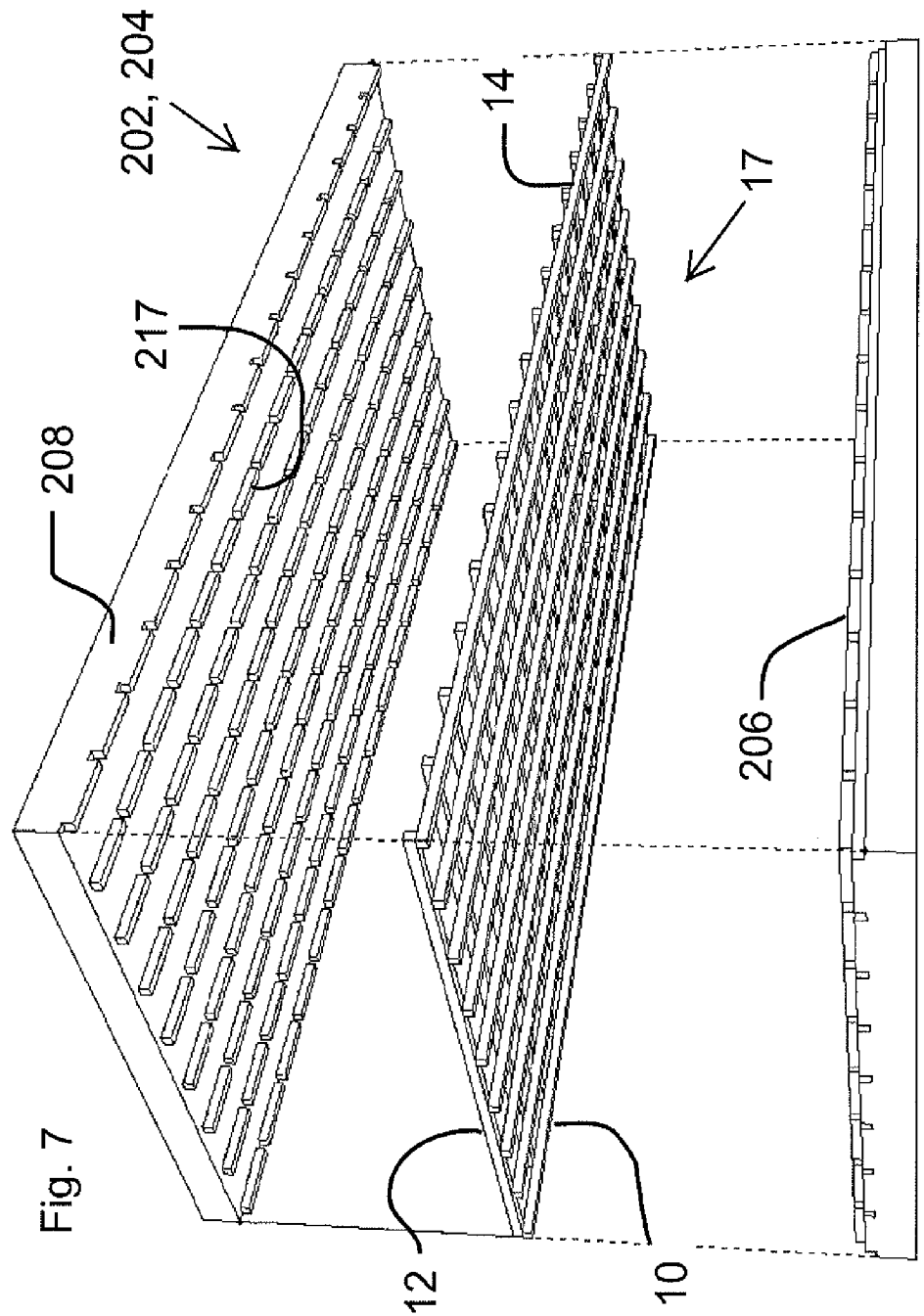
FIG. 7 is a perspective bottom view of the form of FIG. 6.
Figure 8:
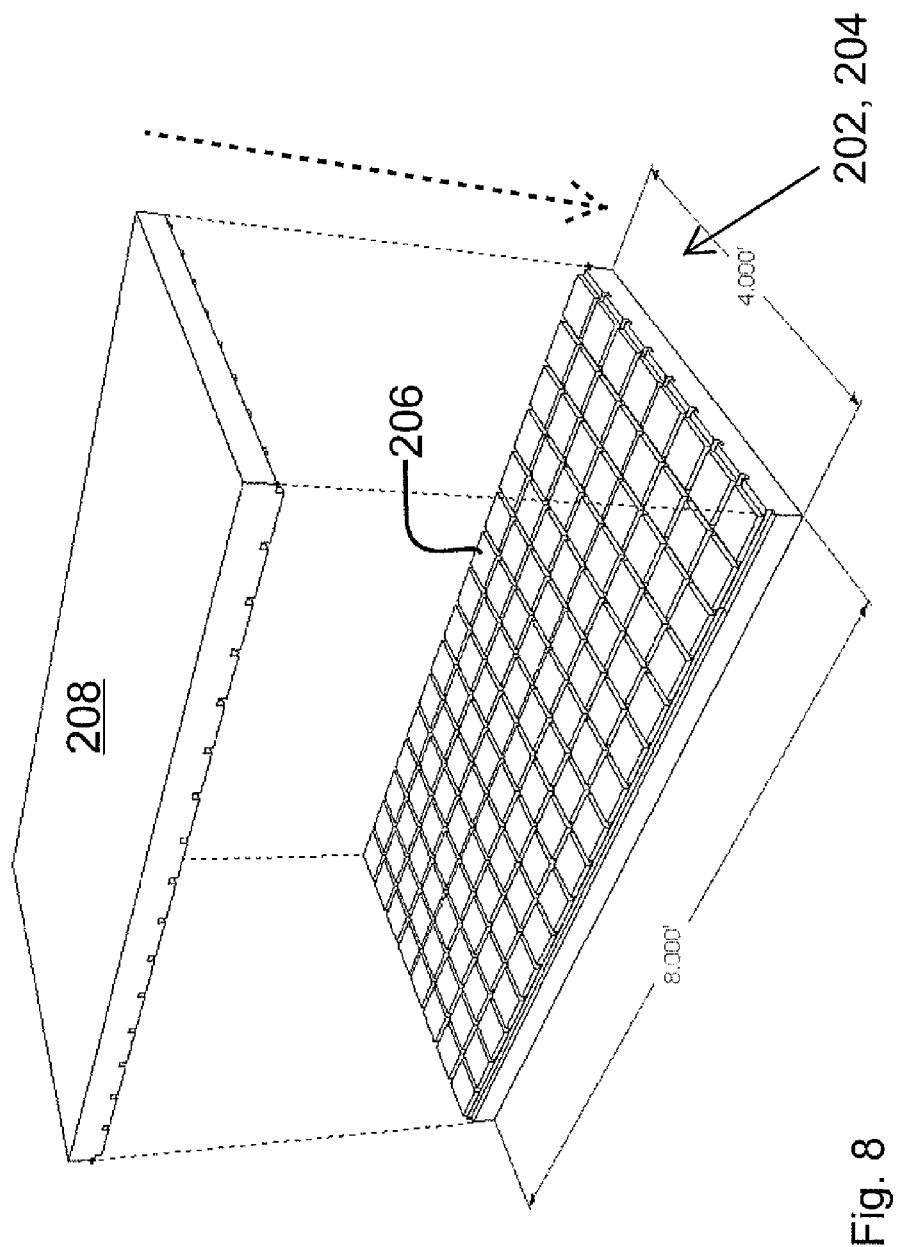
FIG. 8 is a perspective top front view of the form of FIG. 6 without the matrix in the middle.
Figure 9:
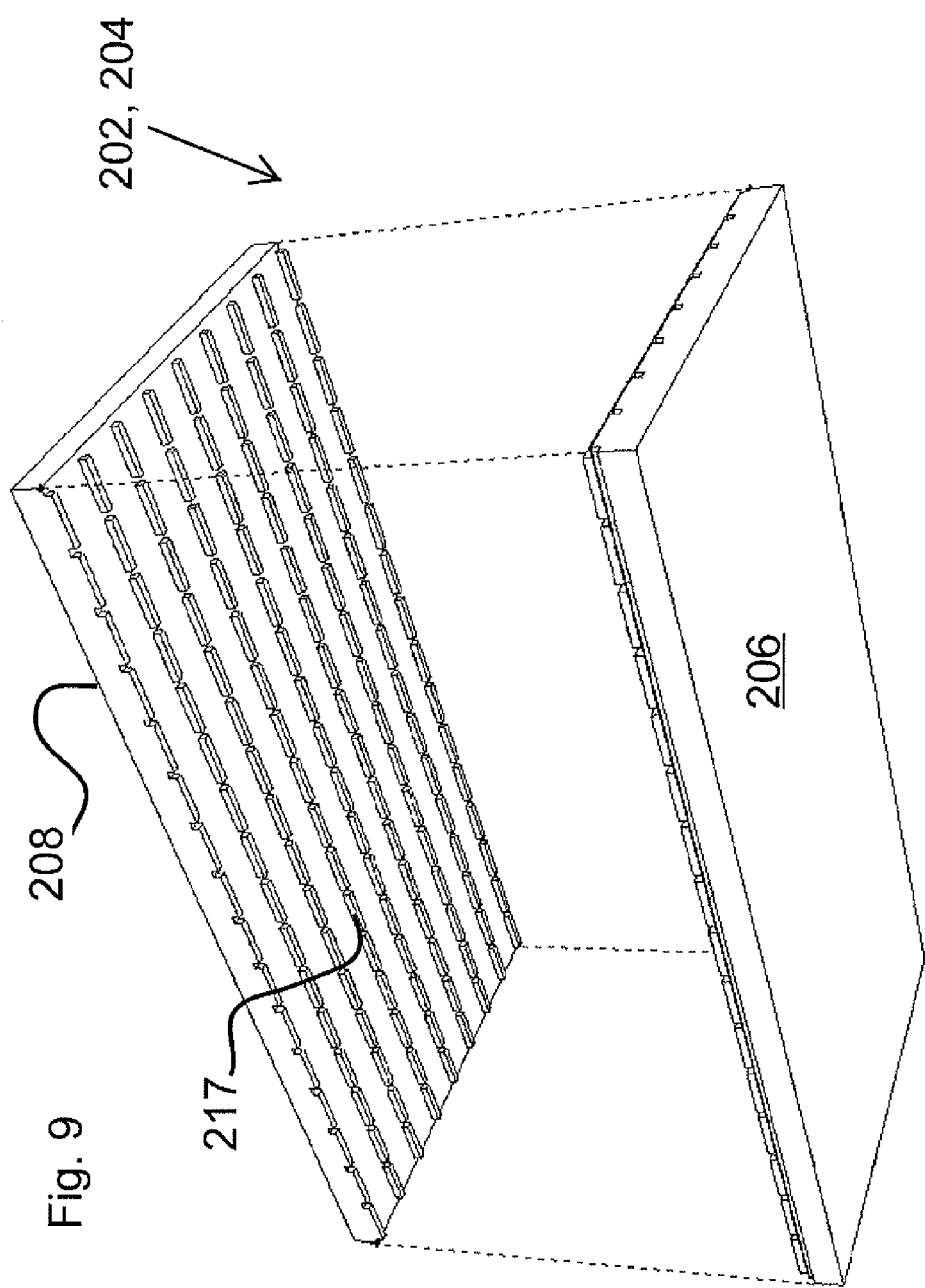
FIG. 9 is a perspective bottom view of the form of FIG. 8.
Figure 10:
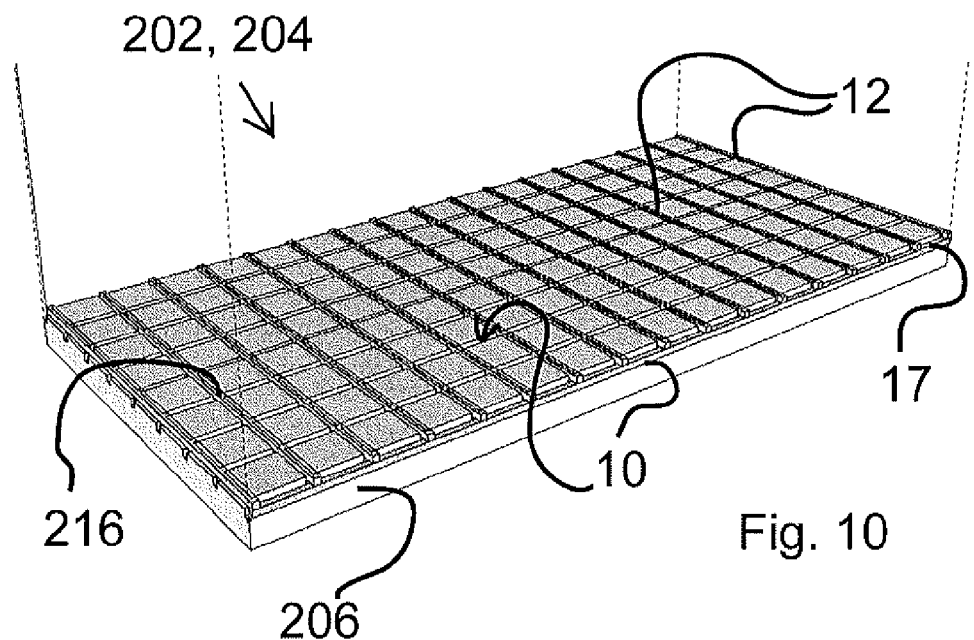
FIG. 10 is a perspective top front view of the bottom plate of the form of FIG. 6 with the matrix in the form.
Figure 11:
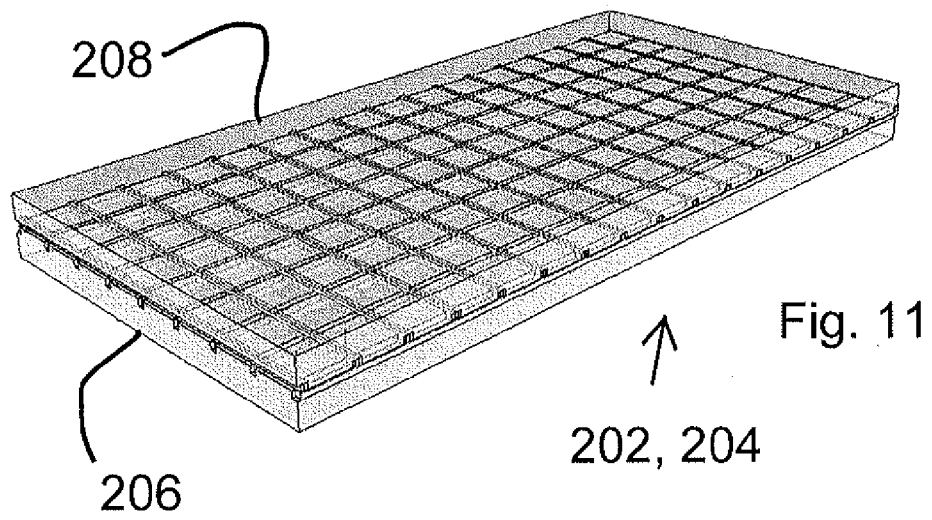
FIG. 11 is a perspective shadow view of the top and bottom plate of the form of FIG. 6 pressed together, with the matrix in the void between the two plates.
Figure 12:
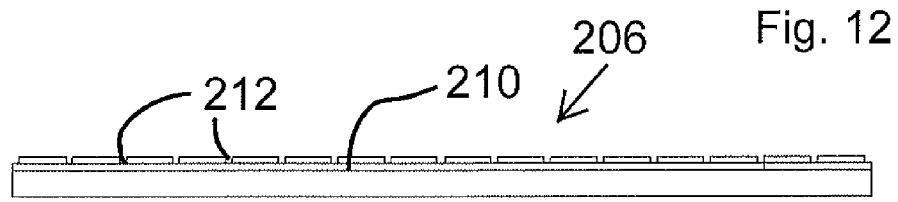
FIG. 12 is a side plan view of the long side of the bottom plate of the form of FIG. 6.
Figure 13:
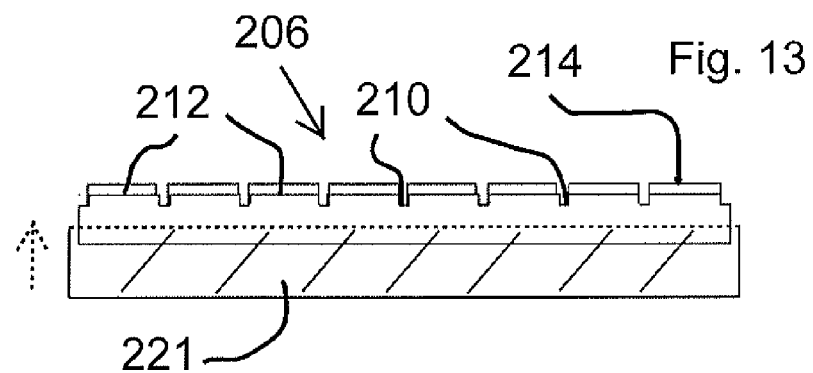
FIG. 13 is a side plan view of the short side of the bottom plate of the form of FIG. 6, with optional encasing.
Figure 14:
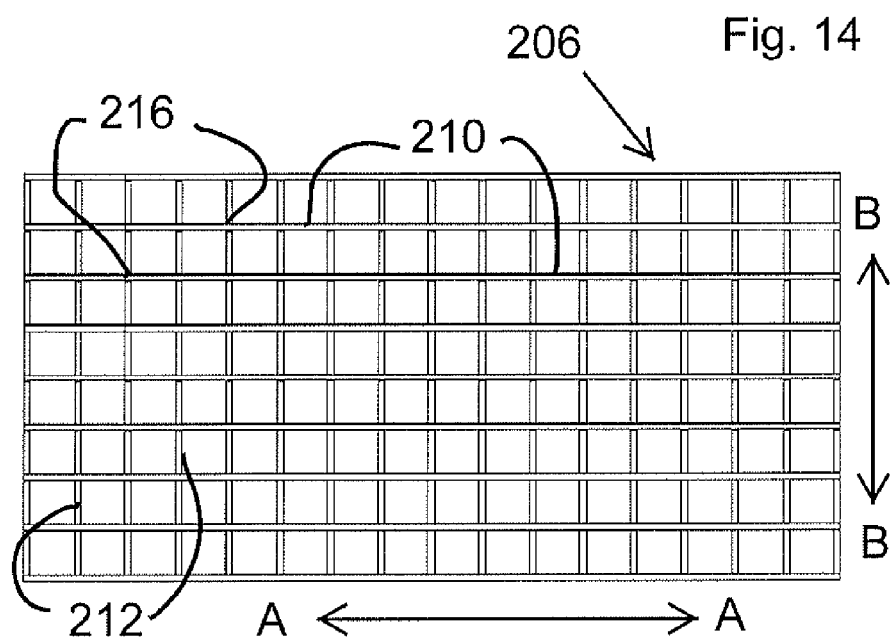
FIG. 14 is a top plan view of the bottom plate of the form of FIG. 6.
Figure 15:
FIG. 15 is a side plan view of the long side of the top plate of the form of FIG. 6.
Figure 16:
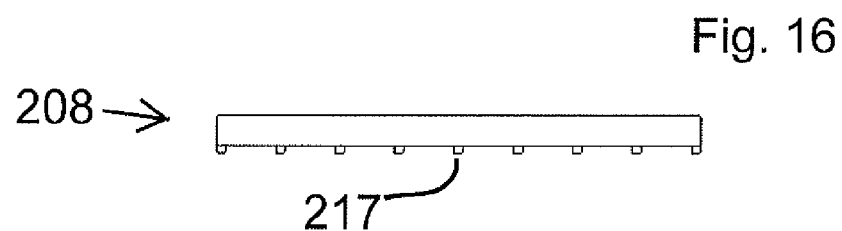
FIG. 16 is a side plan view of the short side of the top plate of the form of FIG. 6.
Figure 17:
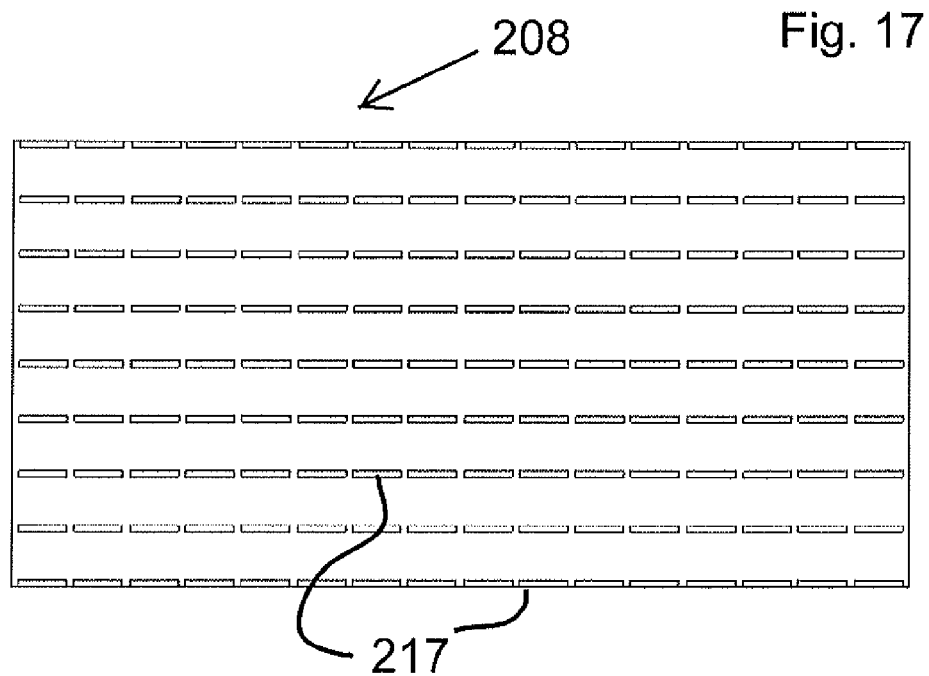
FIG. 17 is a bottom plan view of the top plate of the form of FIG. 6.

As shown in FIG. 5, the panel 2 may be mounted onto mounting elements 40 such as roofing rafters or trusses, flooring joists, or wall studs, just as normal plywood or OSB board would be mounted—twelve inches on center. Because of the panels' increased strength, they may be mounted to mounting elements 40 spaced father apart than a plywood or OSB board of the same thickness as the sum of the thickness of the first and second sheet of the panel would require under similar conditions—including allowing the panels to be mounted on mounting elements 40 spaced sixteen, twenty four, thirty six, forty two, forty eight, and ninety six inches apart on center.

Turning next to FIGS. 6-17, a first embodiment of a form 202 is shown as a planar press from 204. The form shown produces a matrix 17 of elongated members 14 measured at 48"×96". The form 202 has a bottom first plate 206 and a top second plate 208. In this embodiment the first and the second plate 206, 208 are planar, but in other embodiments one or both of the plates 206, 208 may be round and drum shaped.

As shown, the first plate 206 has deep voids 210 and shallow voids 212 formed into the face 214 of the first plate 206, with the deep voids 210 preferably extending twice as deep into the face 214 of the first plate 206 as the shallow voids 212. The deep voids 210 extend elongate and parallel to one another and continuously in a first direction A, defining a first plane. The shallow voids 212 extend elongate and parallel to one another and continuously a second direction B, defining a second plane. The first direction A and second direction B are preferably perpendicular to one another, and the first plane and the second plane are parallel to and preferably spaced from one another. The deep voids 210 and the shallow voids 212 overlap in the first plate 206 at points of overlap 216, such that the matrix 17 formed may be of unitary, one piece construction.

The second plate 208 has discontinuous protrusions 217 extending from its face 214. The height of the protrusions 217 from the face 214 of the second plate 208 are preferably equal to the depth of a top edge the shallow voids 212. The width of the extensions are approximately equal but slightly smaller than the width of the deep voids 210. The protrusions 217 are preferably sized to form either a transition or clearance fit with the deep voids 210, but only partially, ideally halfway, filling the depth of the deep voids 210 when the second plate 208 mates with the first plate 206. The length of the protrusions 217 along the face 214 of the second plate 208 is equal to the distance separating adjacent shallow voids 212 from one another, and are parallel to the first direction A. The protrusions 217 are arranged such that the gaps between the protrusions 217 are aligned and coincident with the points of overlap 216. When the second plate 208 mates with the first plate 206, the protrusions 217 fit into the deep voids 210 up to a height equal to a top surface of the bottom first layer 10 of matrix 17 formed by the deep void 210. The protrusions 217 form the top of the mold for the bottom first layer 10 of the elongate matrix members 14.

To produce the matrix 17 portion of the panel 2 according to this embodiment, either one or both plates 206, 208 of the form 202 are filled with either compressible or non-compressible fibrous/binder matrix material 219. The matrix material 219 preferably would be distributed on the first plate 206, filling all or part of the voids. The matrix material 219 and/or the plates 206, 208 could be preheated as necessary. The second plate 208 would be lowered and the matrix material 219 would be pressed by the form 202 to the desired thickness and pressure, preferably until the face 214 of the second plate 208 comes in contact with the face 214 of the first plate 206. The protrusions 217 would force matrix material 219 out of a top portion of the deep voids 210 and into the shallow void 212 and points of overlap 216. For non-compressible material, the material could be deposited and screed even with the top of the bottom first plate 206. Preferably, the peripheral edges of the plates 206, 208 could be blocked with a peripheral barrier 221 to prevent any matrix material 219 from leaking out of open ends or exterior edges of the voids. It is noted that a peripheral barrier 221 may be used for all forms 202 disclosed herein. Alternatively, small openings could be provided in one or more ends or exterior edges of the voids to allow some excess matrix material 219 to be released as the second plate 208 presses against the first plate 206 and the protrusions 217 forced fluid out of a top portion of the deep voids 210. The small openings would be sufficiently small though to maintain a minimal pressure on the matrix material 219 to allow for bonding/setting to occur. The plates could be heated as required to bond, set, and or cure the matrix material 219, as desired, and then the matrix 17 would be removed/ejected from the form 202 either after or shortly before it had fully cured. If desired, release agents could be applied to the form 202 to aid in the release of the matrix 17, preferably before or concurrent with addition of the matrix material 219. The matrix 17 would then be attached to one or two sheets 4, 6, by mechanical fasteners 224 and/or adhesives, thus forming a ventilated structural panel 2.

The depth from the surface of the first plate 206 at the points of overlap 216 is preferably equal to depth of the deep voids 210 plus the depth of the shallow voids 212, minus the height of the protrusions 217. Such a depth would be consistent with creating matrix members 14 of the first layer 10 directly adjacent and touching, but not intersecting, the matrix members 14 of the second layer 12. The distance between a bottom surface of the lower layer 10 of matrix members 14 and a top surface of the upper layer 12 of matrix members 14 would be equal to the sum of the individual height of the lower layer 10 members 14 plus the height of the upper layer 12 members 14.

Figure 18:
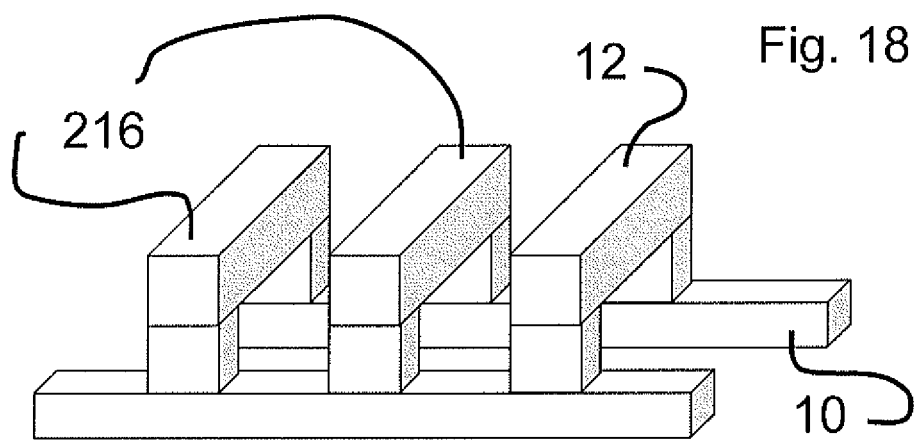
FIG. 18 is a partial schematic iso representation of spaced layers of matrix.

On the other hand, the depth of the points of overlap 216 may be greater than depth of the deep voids 210 plus the depth of the shallow voids 212, minus the height of the protrusions 217, for example, where separation between the first and second layers 10, 12 of the matrix 17 or where a greater intra-sheet 4, 6 clearance is desired. In such a design, as shown in FIG. 18, the elongate matrix members 14 of the first layer 10 would be spaced from the elongate matrix members 14 of the second layer 12, but joined at the point of overlap 216 by a column of matrix material 219.

Figure 19:
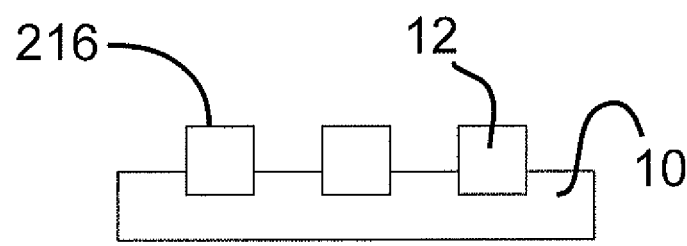
FIG. 19 is a partial schematic side plan representation of intersecting layers of matrix.
Figure 20:
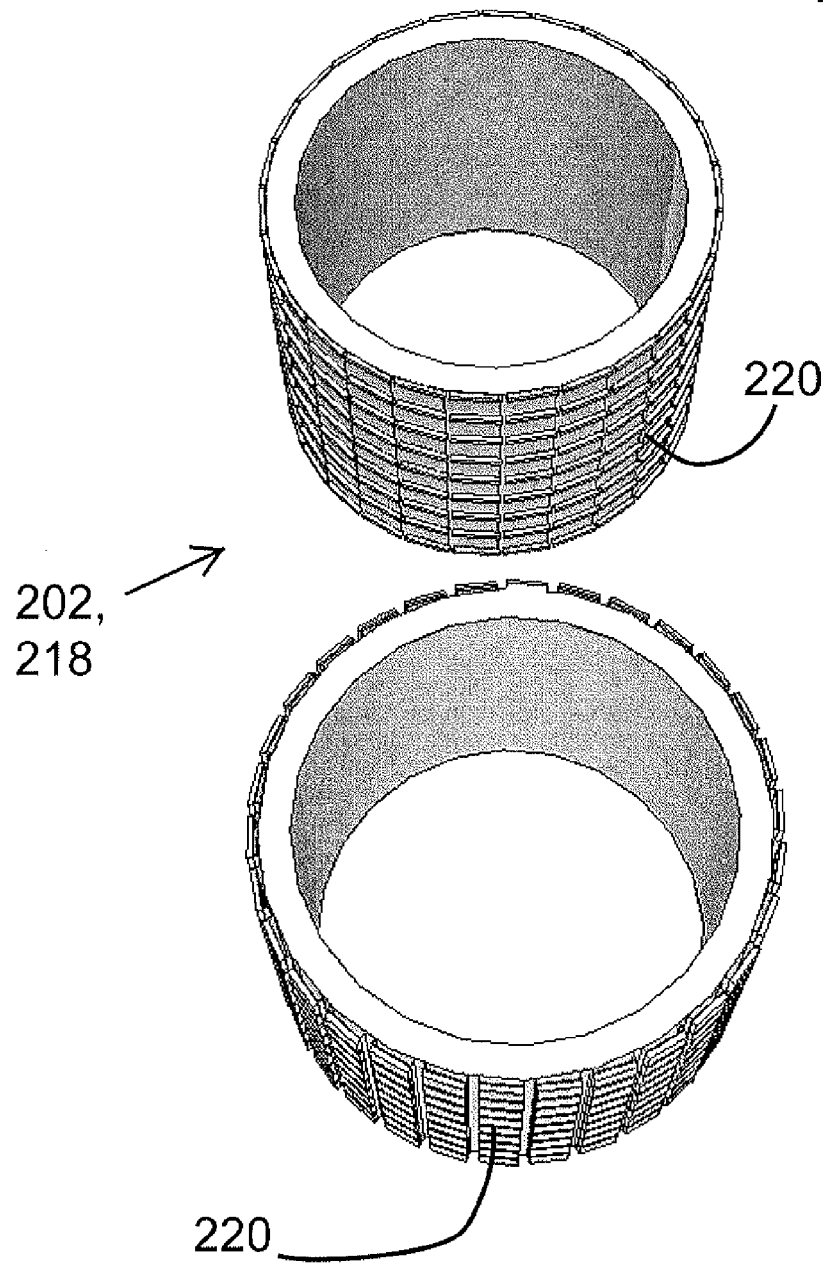
FIG. 20 is a bottom side perspective view of a rotary press embodiment of the form of the presently claimed invention, with the top and bottom rotary plates separated to show detail.
Figure 22:
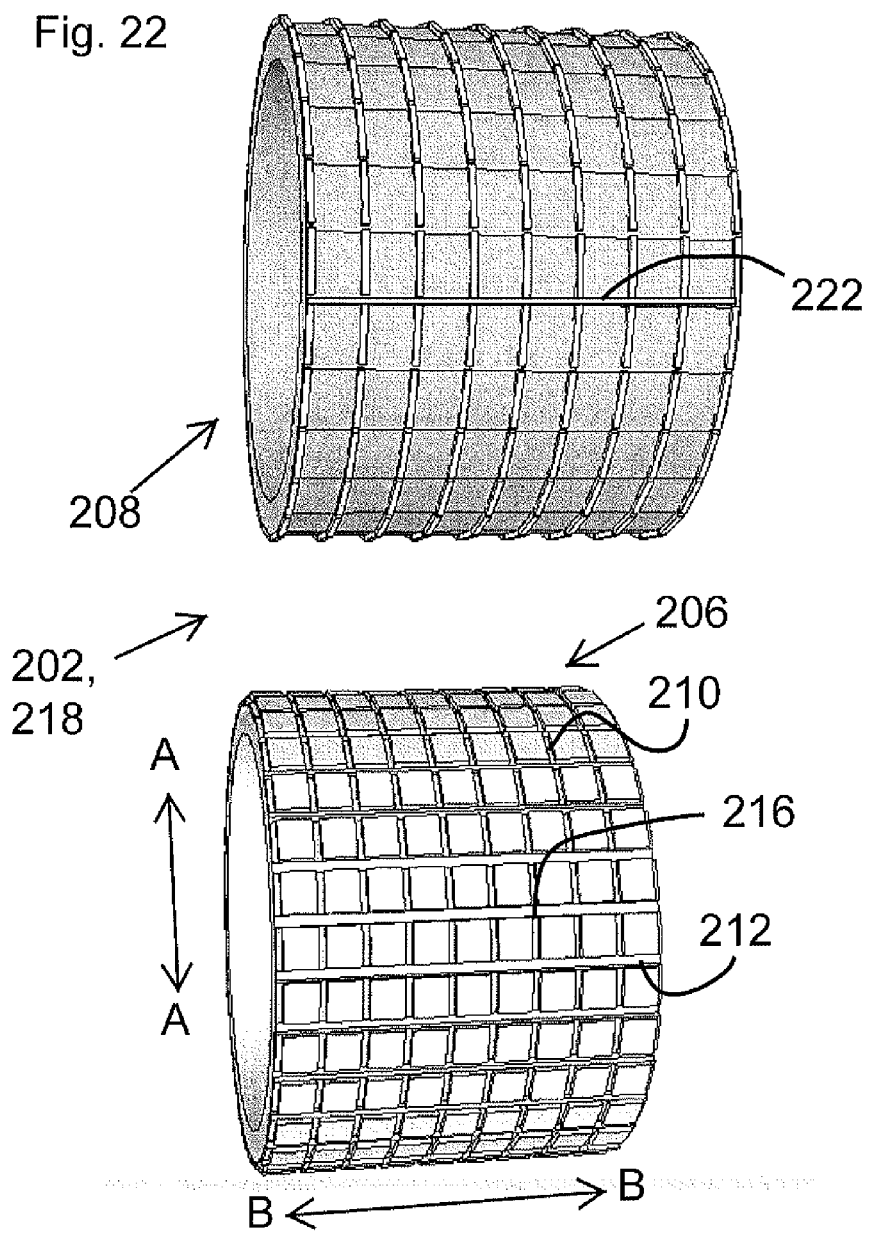
FIG. 22 is a front perspective view of the form of FIG. 20, with the top and bottom rotary plates separated to show detail.
Figure 23:
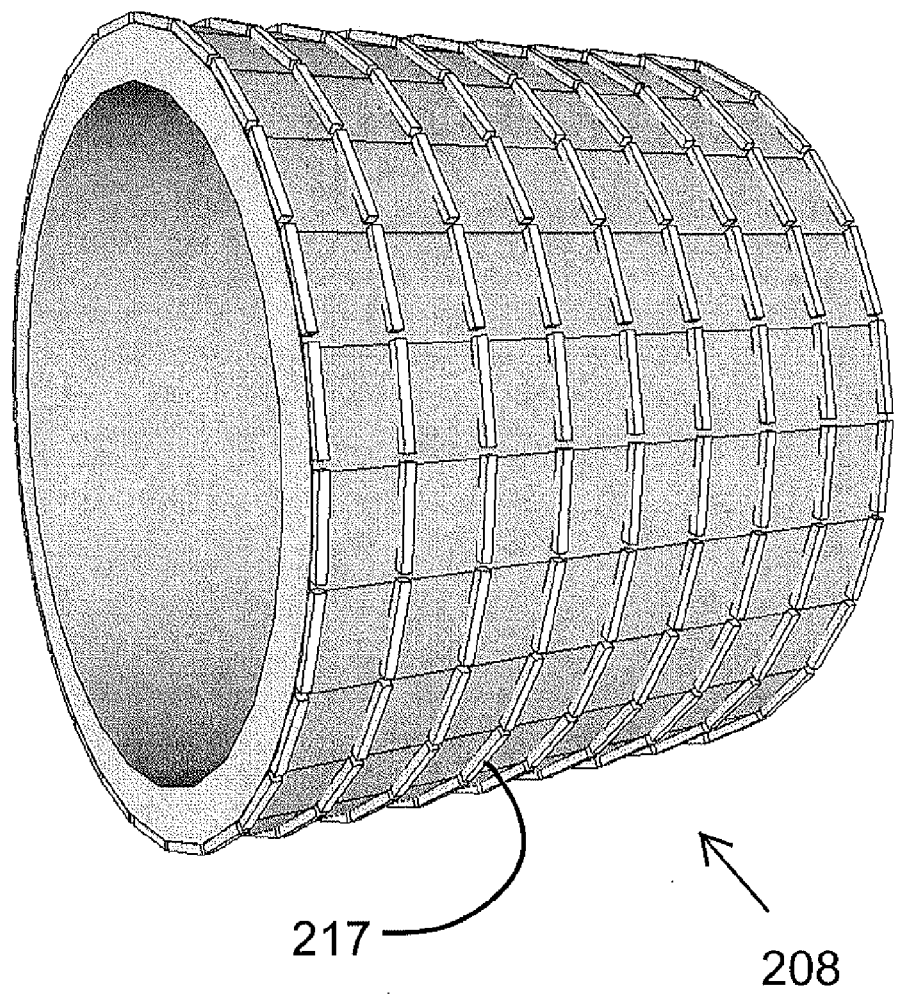
FIG. 23 is a close up front perspective view of the top rotary plate from the form of FIG. 20.
Figure 24:
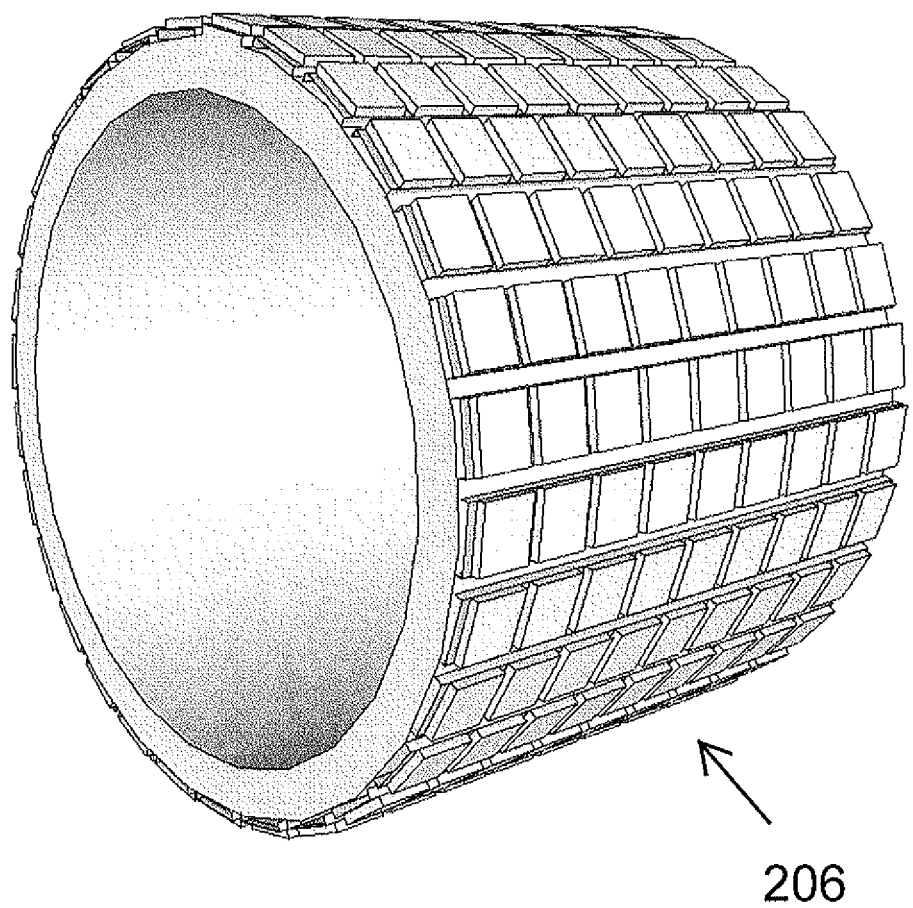
FIG. 24 is a close up front perspective view of the bottom rotary plate from the form of FIG. 20.
Figure 27:
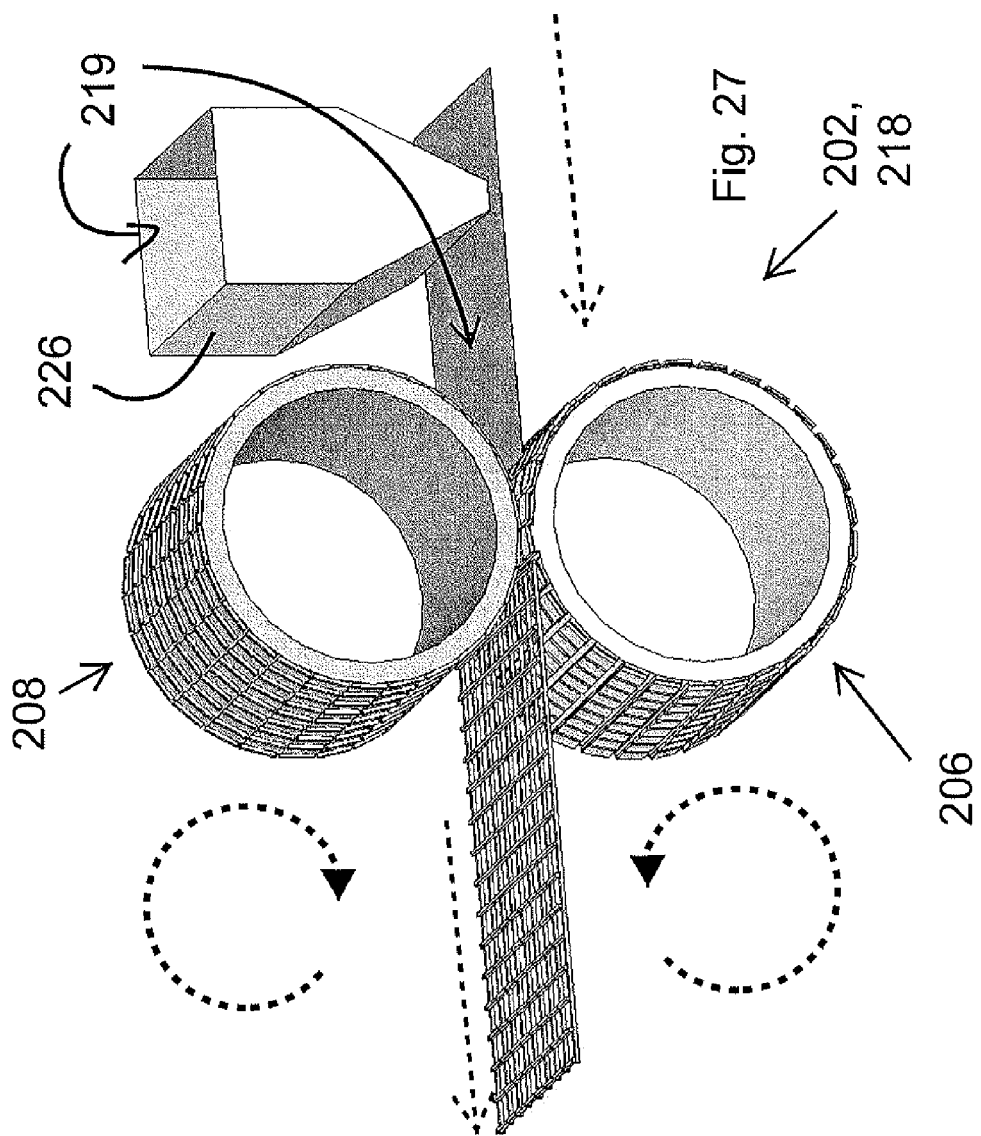
FIG. 27 is a schematic view of the form of FIG. 20, with a feed hopper, producing a matrix.

Conversely, the depth of the points of overlap 216 may be less than the depth of the deep voids 210 plus the depth of the shallow voids 212, minus the height of the protrusions 217, for example, when less clearance in the interior of the panel 2 and more integration between the first and second layers 10, 12 of the matrix 17 is desired. In such a design, as shown in FIG. 19, the elongate matrix members 14 of the first layer 10 would intersect the elongate matrix members 14 of the second layer 12, and the distance between a bottom surface of the lower layer 10 and a top surface of the upper layer 12 would be less than the sum of the height of the lower layer 10 plus the height of the upper layer 12.

Turning next to FIGS. 20-28, the form 202 described above can also be constructed as a rotary press form 218, with the first and the second plate 206, 208 shaped as two cylindrical, drum shaped rotary plates 220, so that the matrix 17 production can be a continuous operation, without requiring reciprocating vertical motion of one or both plates 206, 208. In this embodiment, the second plate 208 presses the first plate 206, not by vertically lowering the second plate 208 onto the first plate 206, but by rotating the first and the second plates 206, 208 relative to one another while the surface 214 of the two plates 206, 208 are in contact with one another. The rotary plates 220 shown have a nominal 96 inch circumference and a width of 48 inches, such that one rotation of the rotary plates 220 produces a matrix 17 sized for a typical 4 foot by 8 foot ventilated structural panel 2. For production efficiencies, these dimensions could be greatly increased with the limits of the production machinery. For example, a 24 foot wide matrix 17 could be continuously manufactured with a pair of 16 foot circumference 24 foot wide rotary plates 220. This 24 foot wide matrix 17 could be trimmed, if desired, to create twelve individual four foot by eight foot matrices for every rotation of the rotary plates 220 in the rotary press form 218. Each matrix 17 could then be incorporated into a 4 foot by 8 foot ventilated structural panel 2.

If desired, interruption element 222 in the form of a linear cutting edge or filled void section could be disposed on the surface of the rotary plates 220 from one edge to the other. The cutting edge 222 would be a specialized protrusion 217 stretching from one axial edge to the other axial edge of the surface 214 of the second plate 208. When the rotary plates 220 are rotated past the cutting edge 222, the cutting edge 222 would push out all fo the matrix material 219 in the deep void 210 on the first plate 206—from one edge of the rotary plate 220 to the other—out, and thereby, in effect, automatically "cutting" the matrix 17 at given intervals. Alternatively, a filled void section interruption element 222 would comprise one or more locations along the face of the first plate 206 where there are no voids 210, 212 in the surface 214 of the plate first 206, stretching from one axial edge to the other axial edge of the surface 214 of the first plate 206—as if all the voids for that location were filled in. An example of employing interruption elements 222 would be having one cutting edge or filled void section 222 present along the circumference of a 96" circumference rotary plate 220. Here the rotary press form 218 would produce one 8 foot long matrix 17 with each full rotation of the rotary plates 220.

Alternatively, or in addition, to produce multiple matrices 17 or a fraction of the width of the rotary press form 218, a interruption element 222 in the form of curved arcuate cutting edge or filled void section could be circularly disposed around the circumference of the rotary plates 220. The arcuate cutting edge 222 would automatically cut the matrix 17 into widths of fractional size to the width of the rotary form 202. For example, the 24 foot wide rotary press form 218 above could have five arcuate cutting edges 222 axially spaced equidistant apart along the faces 214 of the second plate 208, such that the 24 foot wide rotary press form 218 automatically produced six 8 foot wide matrices 17, without requiring an extra cutting step.

The voids 210, 212 in the rotary press form 218 would be filled could be filled with the same matrix material 219 as the planar form 204, such as wood fibers, heated/expanded wood fibers (e.g., masonite), fiberglass, carbon fiber and other materials such as plastics, metals and formable materials suitable for adequately transferring necessary stresses once set.

The Figures show the rotary plates 220 separated for display purposes. In production they would normally run without separation, producing, for example, a matrix 17 of joined ¾×¾ elongated members 14. Like the planar form 204, the size and spacing of the matrix 17 produced by the rotary press form 218 can vary. It should be noted that while the width of the top and bottom rotary plates 220 are ideally of equal width, it is not required. Like gears, the circumference of the two rotary plates 220 may be different, so long as the void 210, 212 spacing and protrusion 217 spacing align. Different sized first and second plates 206, 208 may be preferable based on cost, space limitations, or other factors.

In production, a typical setup would include a hopper 226 on input side of the rotary form 202, distributing matrix material 219 (fiber and binder) onto a conveyer. The conveyer takes the matrix material 219 and feeds it into the voids 210, 212 of the rotary plates 220. The matrix material 219 then gets pressed and heated (as required), and bond, set, and or cured by the rotary plates 220 and is the ejected on an output side of the rotary form 202.

The hopper 226 delivers a predetermined amount of fiber/binder 219 to the conveyor which feeds into the interlocking rotary plates 220. The top second plate 208 fits into the bottom first plate 206 such that the matrix 17 is formed as it exits the rotary press form 218. The matrix material 219 can be screeded by a screeder to a predetermined thickness before entering the rotary plates 220.

Figure 28:
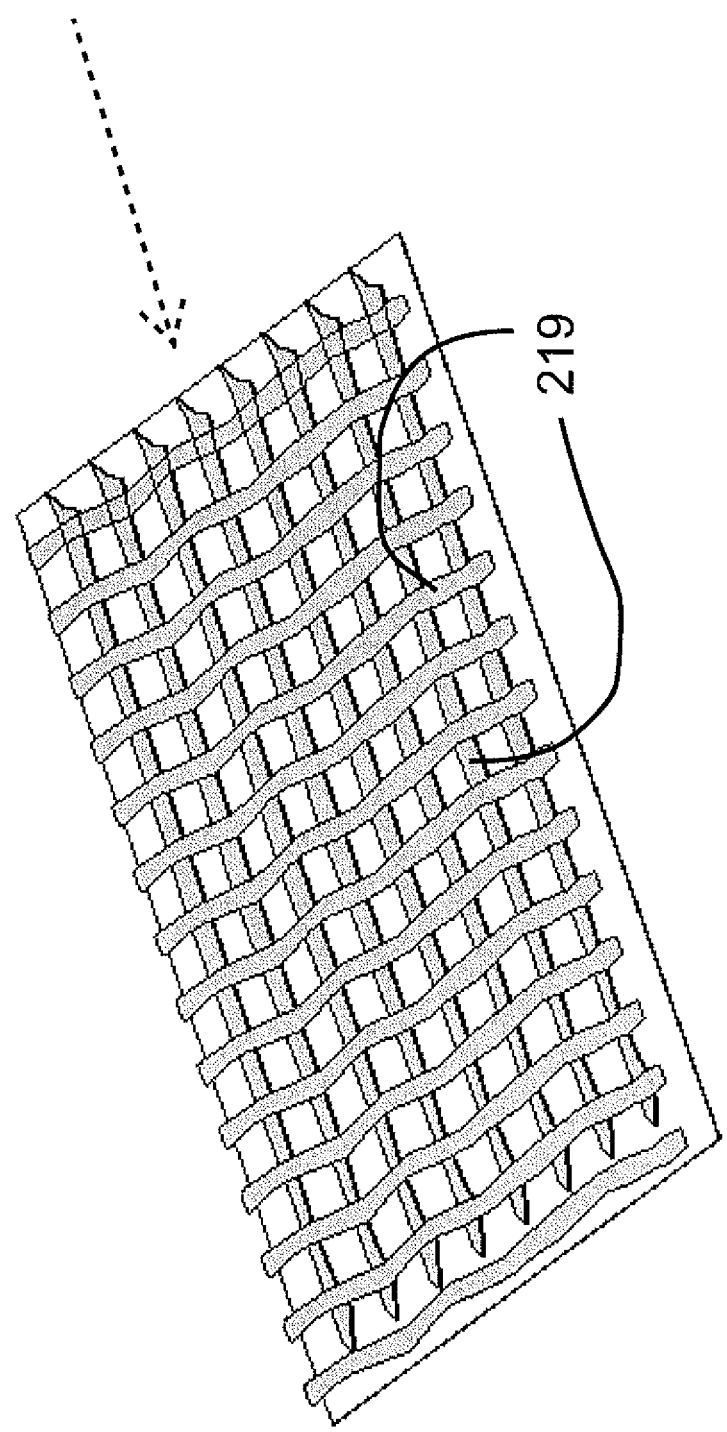
FIG. 28 is a schematic view of a layout of fibrous material for feeding into the form of FIG. 20.
Figure 29:
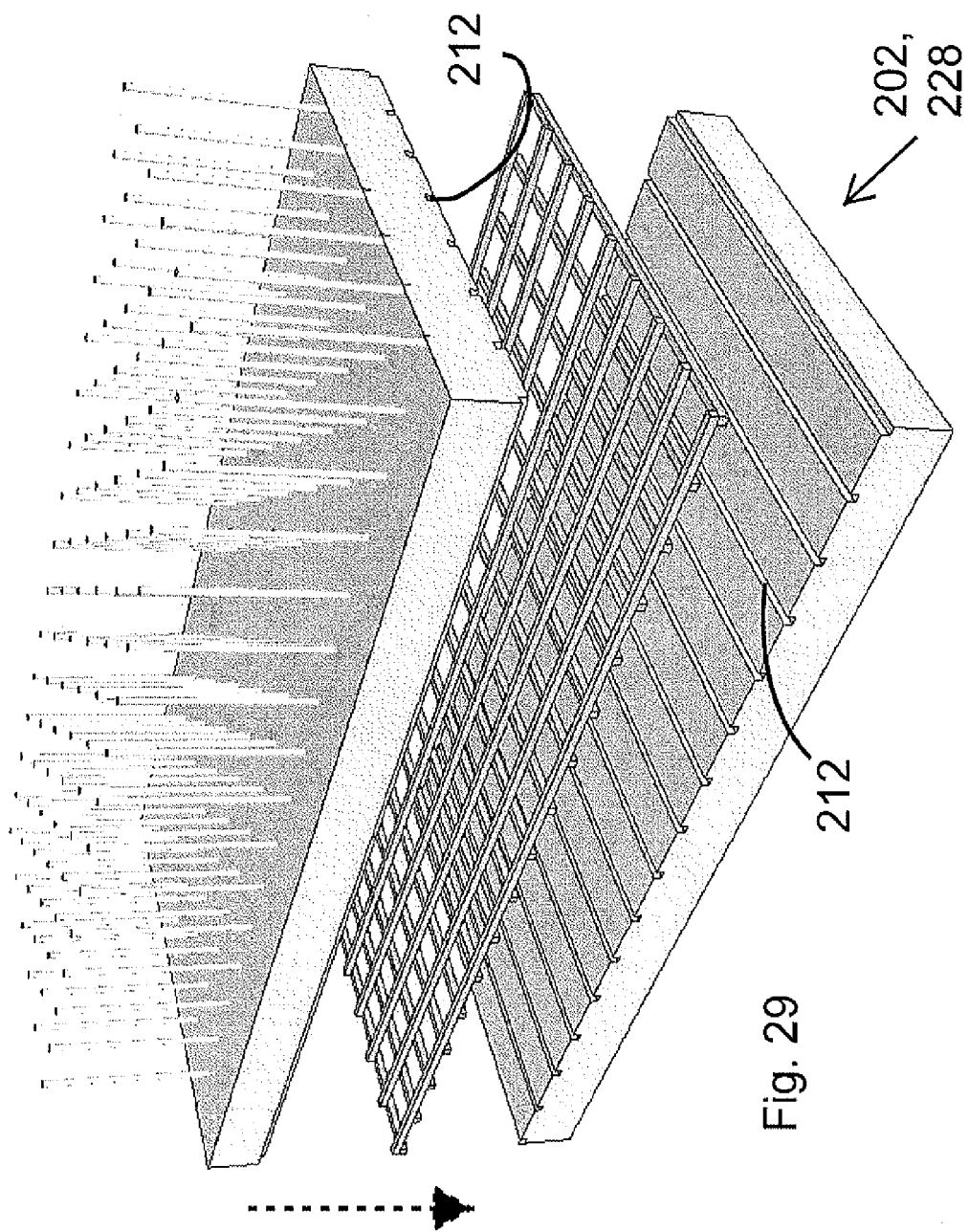
FIG. 29 is an exploded perspective view of planar press form with integrated fill tubes.
Figure 30:
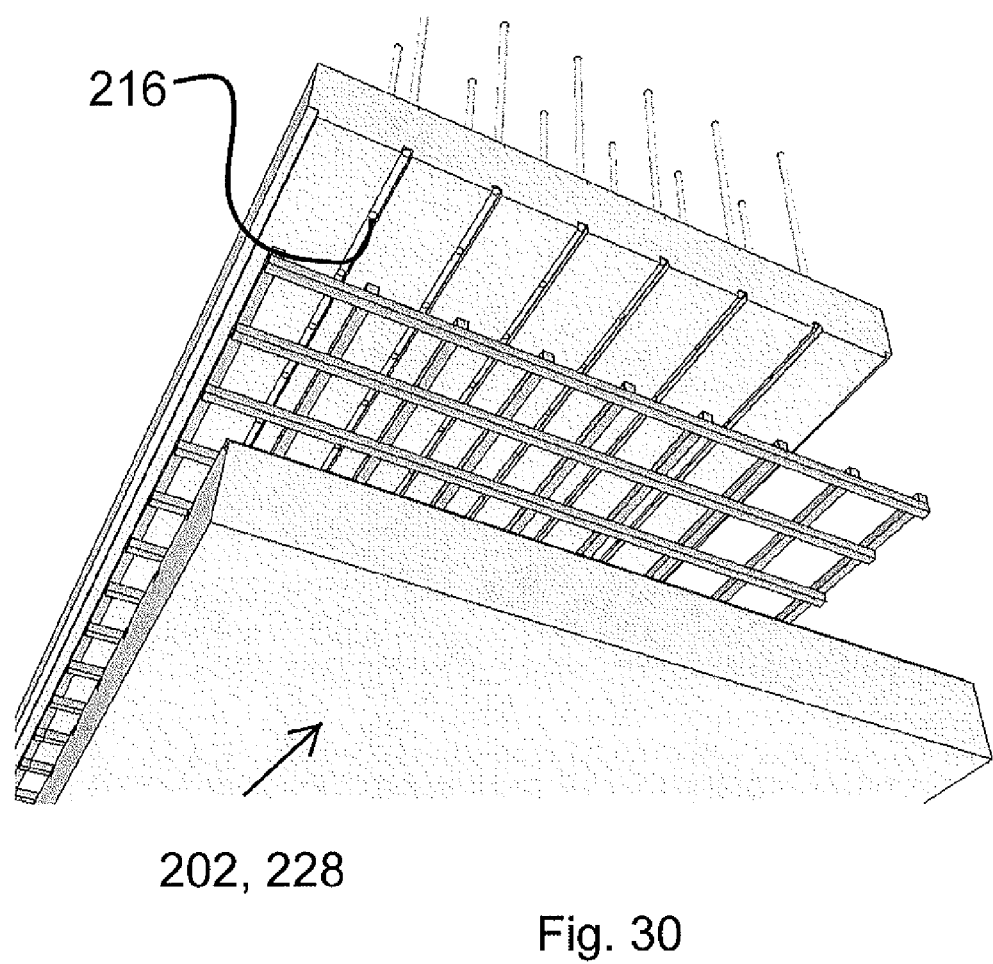
FIG. 30 is a bottom front perspective view of the form of FIG. 29.
Figure 31:
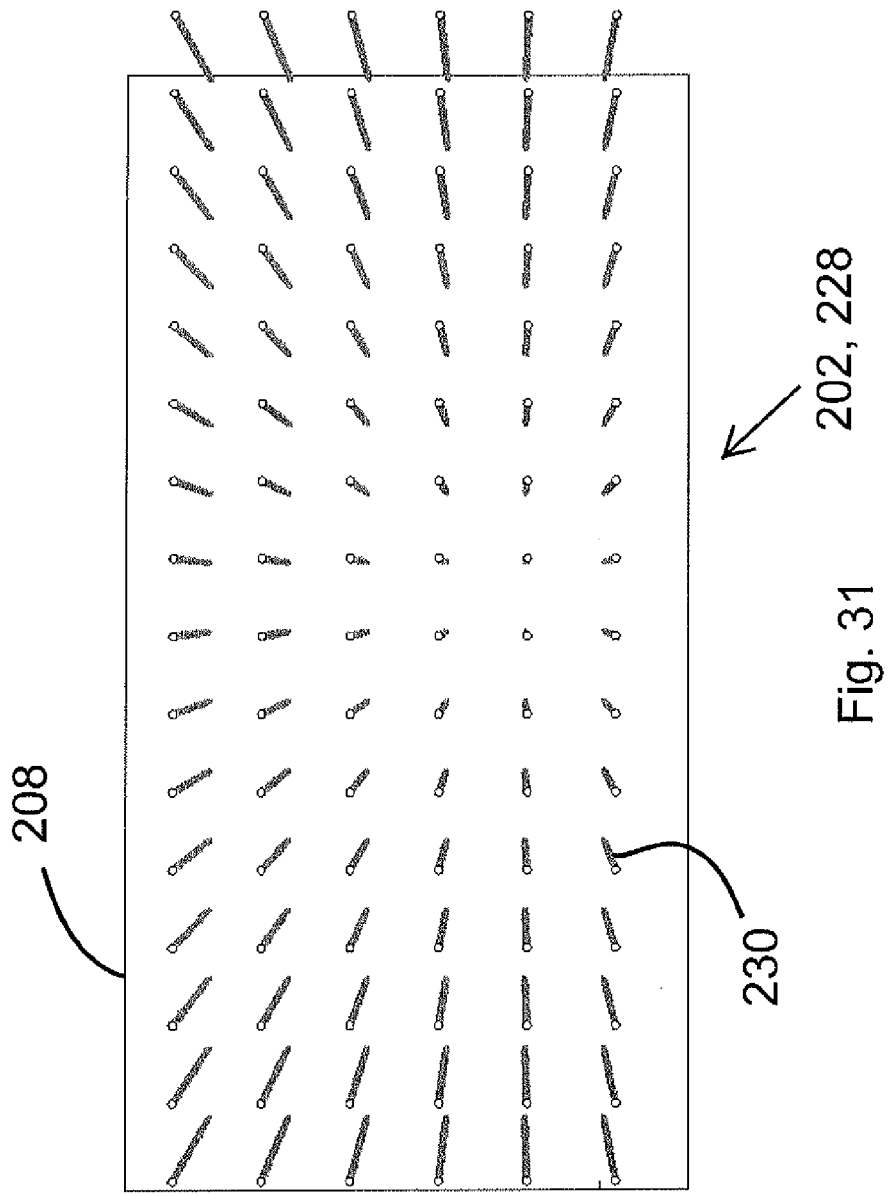
FIG. 31 is a top perspective view looking down on the top plate of the form of FIG. 29.
Figure 32:
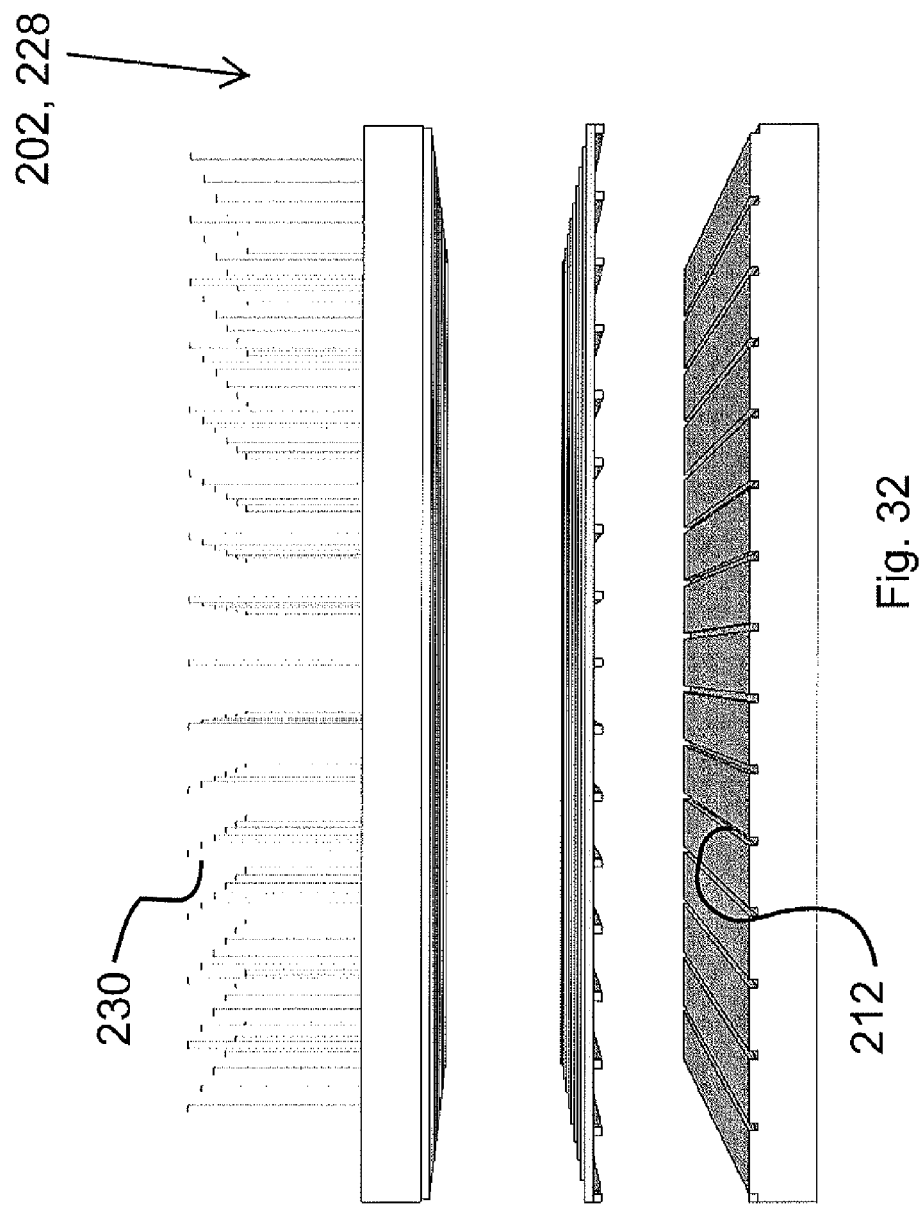
FIG. 32 is a side perspective view of the long side of the form of FIG. 29.
Figure 33:
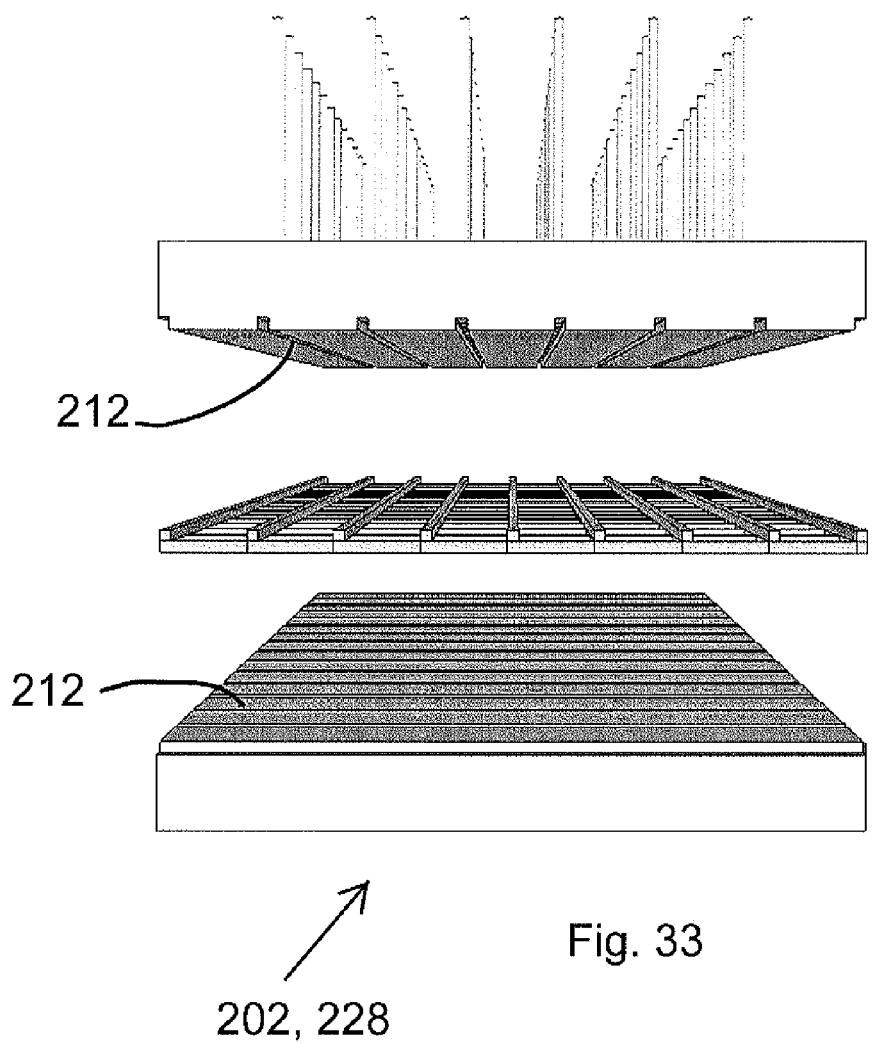
FIG. 33 is a side perspective view of the short side of the form of FIG. 29.

As shown in FIG. 28, further refinement on the feeding of matrix material 219 can be done by depositing a predetermined line of material 219 aligned with the longitudinal voids 210, 212 the first plate 206 and then dropping predetermined amount of material 219 that would be aligned with the perpendicular horizontal voids 210, 212 of the first plate 206.

Turning now to FIGS. 29-33, a non-compressive planar form 228 is shown with single layer of shallow voids 212 formed in each of first bottom plate 206 and the second top plates 208. Such an embodiment is generally preferable for matrix material 219 which does not require compression to bond, set, and or cure. The matrix members 14 are shaped by the void 212 defined in one plate 206, 208 and a surface 214 of the other plate 206, 208. This embodiment is also shown with integrated fill tubes 230. The fill tubes 230 penetrate the non-compressive planar form 228, preferably at the points of overlap 216 in the second plate 208, but could be additionally or alternatively in first plate 206, and could be in a location other than the points of overlap 216. The fill tubes 230 are preferably fluidly connected together to deliver a predetermined amount of matrix material 219 into the voids 212, such that minimal excess material 219 is extruded at the edges.

Figure 34:
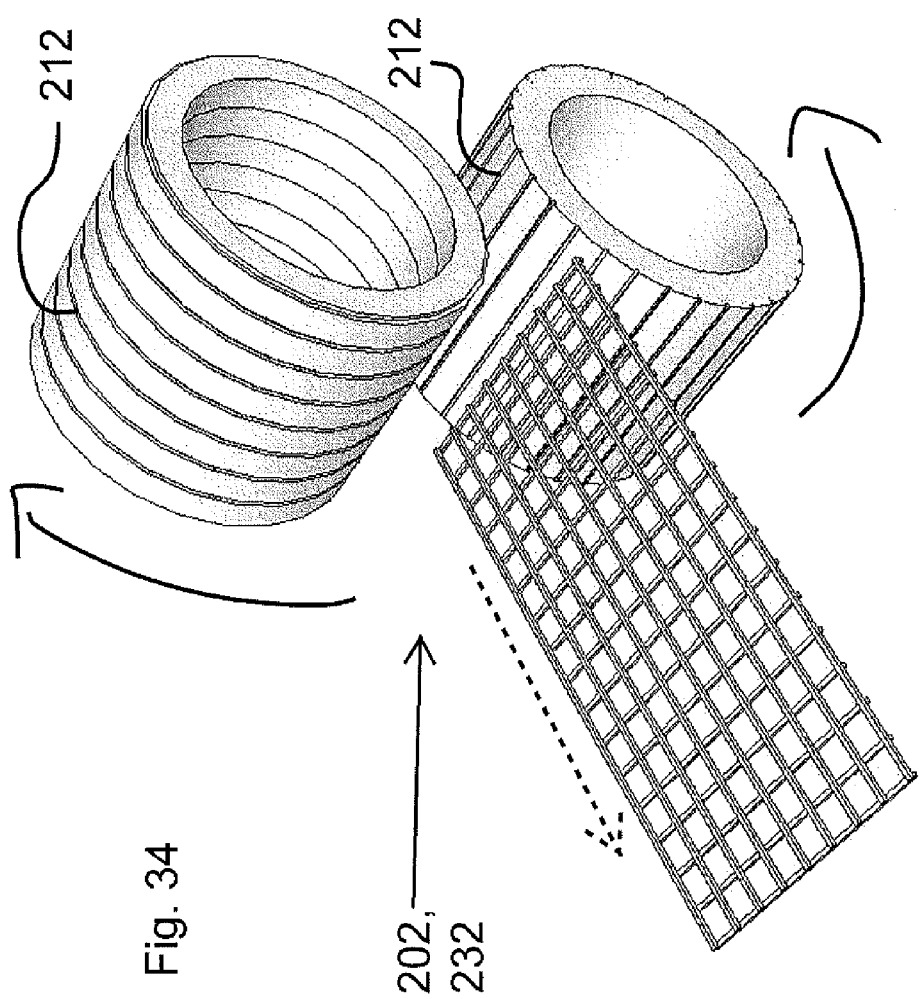
FIG. 34 is a perspective view of a second embodiment of a rotary press form of the presently claimed invention.
Figure 35:
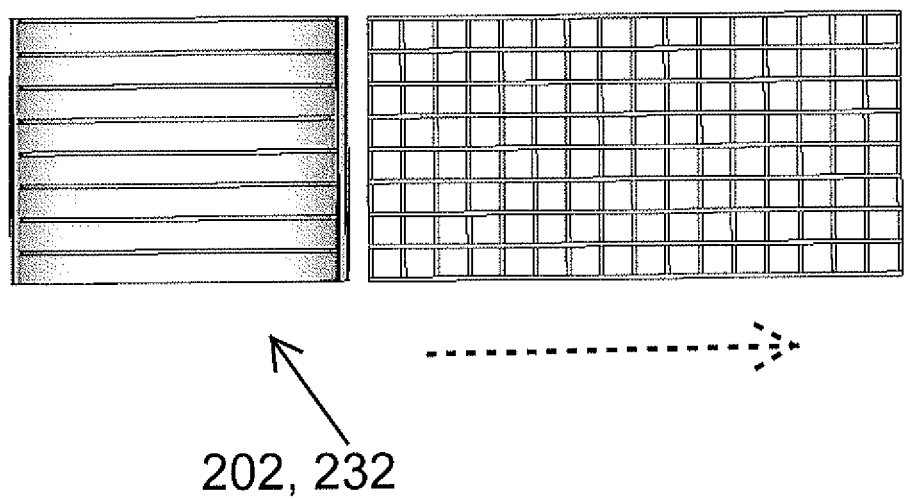
FIG. 35 is a top plan view of the form of FIG. 34.
Figure 36:
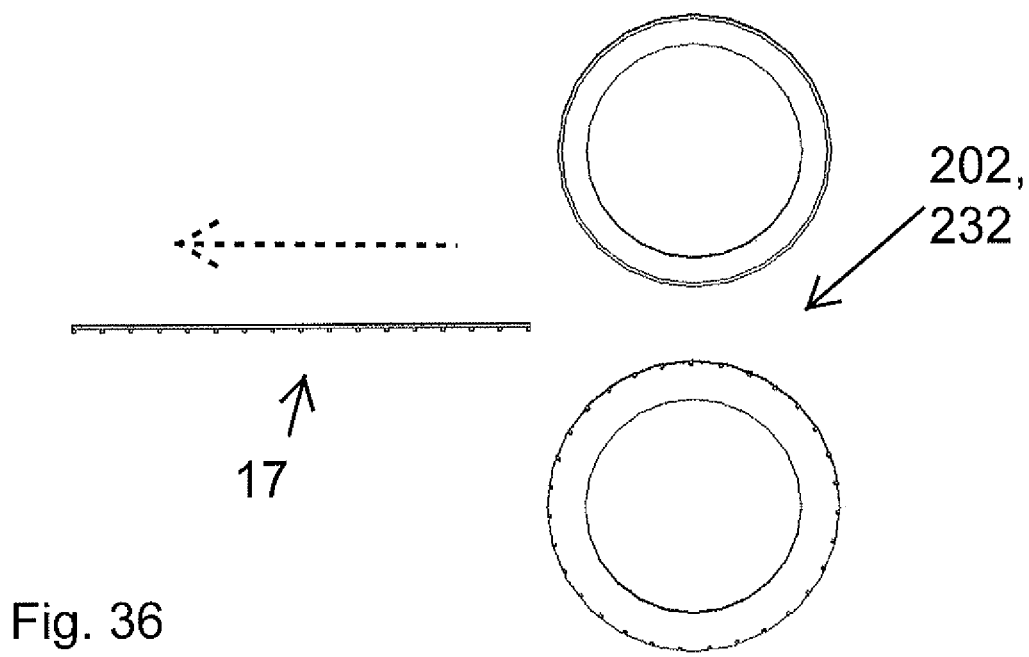
FIG. 36 is a side plan view of the form of FIG. 34.
Figure 37:
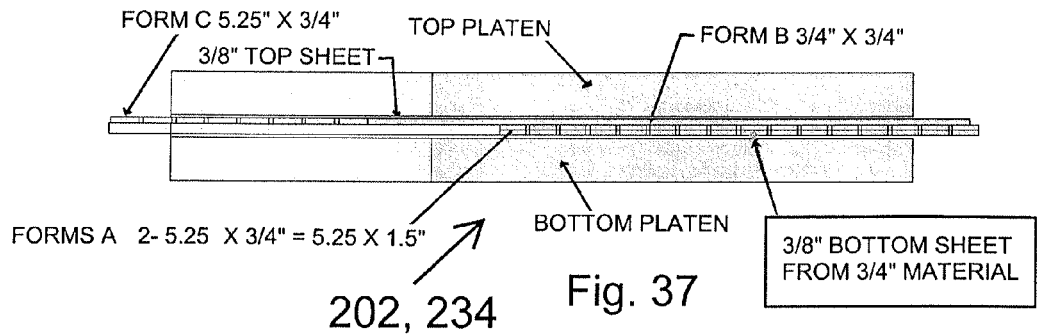
FIG. 37 is an side corner plan view of a full panel form embodiment of the presently claimed invention.
Figure 38:
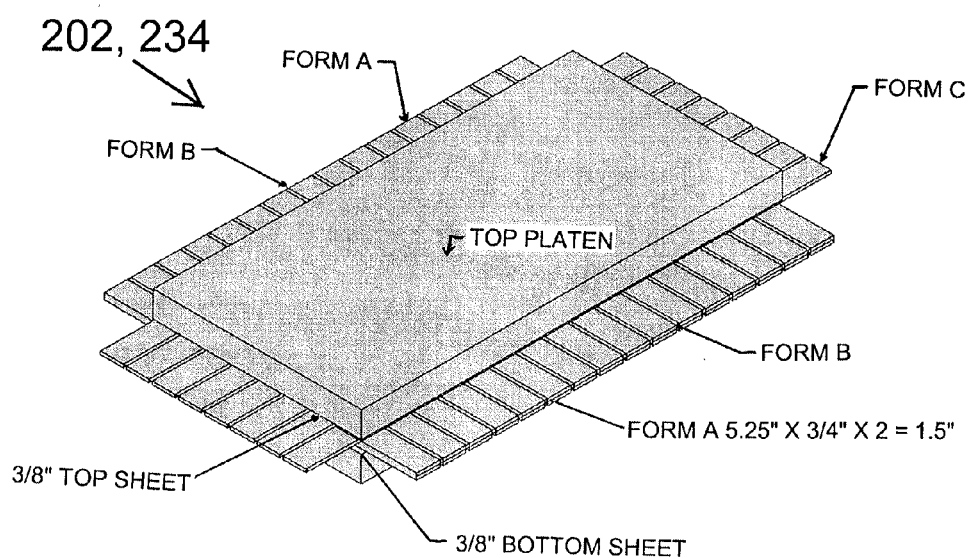
FIG. 38 is a front top iso view of the form of FIG. 37.
Figure 39:
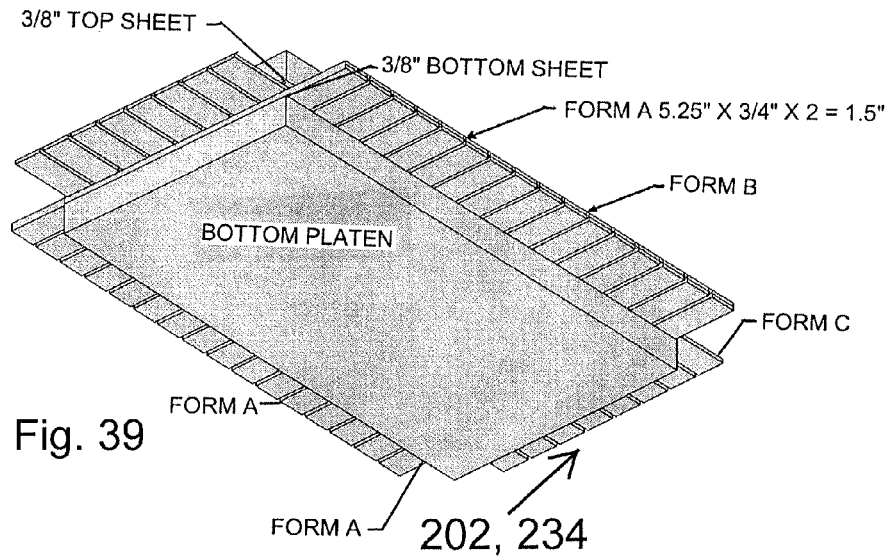
FIG. 39 is a front bottom iso view of the form of FIG. 37.
Figure 40:
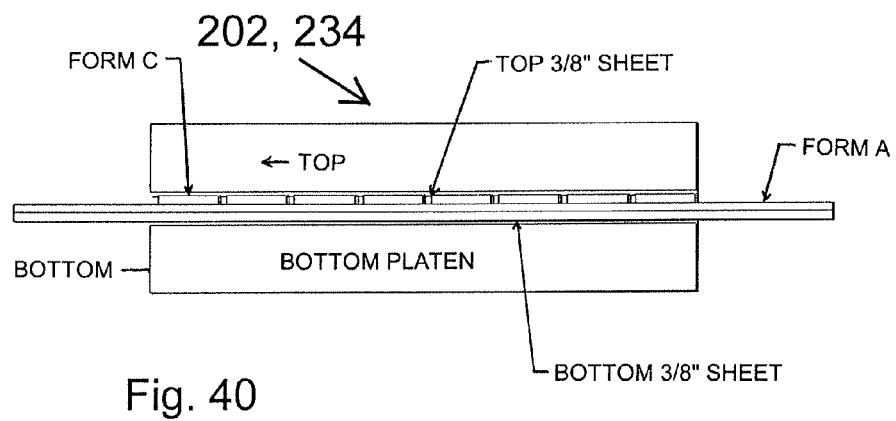
FIG. 40 is a side plan view of the short side of the form of FIG. 37.

Turning next to FIGS. 34-36, a non-compressive rotary form 232 with single layer of shallow voids 212 formed in each of the top and bottom rotary plates 220 is shown. Like the non-compressive planar form 228 in the previous embodiment, this non-compressive rotary form 232 is generally suited for matrix material 219 that does not require compression to set, bond, or cure. Non-compressive rotary forms 232 could also have integrated fill tubes 230 (not shown). The integrated fill tubes 230 could enter one side of rotary plate 220 near a center of the circle formed by rotary plate 220 in either the first or second plate 206, 208 or both. The integrated fill tubes 230 could then flow like a spoke into the voids 212 defined in the face 214 of the rotary plates 220. Unlike the non-compressive planar form 228 above, for the non-compressive rotary form 232 the integrated fill tubes 230 would preferably deliver matrix material 219 asynchronously to the various voids 212 in the first plate 206, but simultaneous to different portions of the all the voids on the second plate 208, so that a matrix 217 was formed at the engagement of the first plate 206 with the second plate 208. It is noted that the non-compressive forms 228, 232 might still exert some compressive force on the matrix material 219, or just negligible amounts of compressive force, depending on the amount of material 219 forced into the voids 212, and other factors.

Turning next to FIGS. 37-42, the production of the ventilated panels 2 via forms 202 could be further expanded and altered to include a method for forming an entire ventilated structural panel 2 with integral unitary matrix 17 and sheets 4, 6 in an integrated form 234. As shown in the Figures, a method is disclosed by which the matrix 17 and the sheets 4, 6 may be formed together as a unitary member, in a generally single step. The method assumes compression ratio of 2:1 for fiber/binder material 17—dimensions would be proportionally altered with different compression ratios. The method assumes desired top and bottom sheets 4, 6 are ⅜", and the matrix 17 dimensions are ¾"×¾" at 6" o.c.

Steps:
1. Place ¾" of material evenly on bottom platen.
2. Place Forms A (Section of 5.25"×¾" in two layers totaling 1.5") spaced ¾" apart and compress material to ⅜" thickness.
3. Fill cross voids between Forms A with material to surface.
4. Place forms B (Section ¾"×¾" into void between Forms A. and compress to ¾" thickness so top of Forms B are even with Forms A.
5. Remove top half of forms A.
6. Remove Forms B.
7. Place Forms C (Section 5.25"×¾") perpendicular and directly on the surface existing top surface on top of the compressed material in the same plane as the top of the bottom half of Forms A.
8. Fill Voids between Forms C.
9. Place ¾" of material over the entire 4'×8' sheet.
10. Place additional material comprising a sectional size of ¾"×¾" directly over the voids filled in step 6.
11. Compress Top Platen ⅜" so that the top sheet is formed with a thickness of ⅜";
12. After setting, curing, or bonding, remove top platen.
13. Withdraw all forms linearly from the sides.
14. A full, unitary ventilated structural panel 2 is complete. Heat should be applied as needed during the method, depending on the matrix material 219 used.

Optionally, if additional top material cannot be deposited in ¾"×¾" sectional line with precision over the void on form C in step 8 above:
8*. Apply a Forms D (Section of ¾" wide by ⅜" depth) between Forms C and compress ⅜".
9*. Remove Forms D and fill resulting void.
10*. Place ¾" of material over entire 4'×8' panel.
11*. Compress Top Platen ⅜" to form top sheet
12*. Follow same un-molding procedure above.

In an alternative embodiment to the method listed above, manufactured sheets (plywood, OSB, or other material) may be used in place of one or both of the platens. Utilizing the preceding method disclosed, the method can be combined with the utilization of already manufactured top and bottom sheets 4, 6 of plywood, OSB or other material. The method would begin with the placement of the desired bottom sheet 4, for example, a ⅜" thick sheet. The method would then continue with prior step 2 of placing Forms A. At step 10, instead of placing ¾" of top material 219, a top sheet 6 of the desired thickness would be placed on and compressed. Adhesives would be applied if necessary to join the sheets to the matrix 17.

This method of unitary construction of the panels is also suited for creating unitary construction multi-plenum panels.

Turning to FIGS. 43-46, the manufacture of the matrix 17 of the ventilated structural panels can be made with a post press, pre-press, or concurrent to press introduction of mechanical fasteners 224 would preferably be made of metal, plastic or composite materials, and be shaped and placed so as to facilitate connection of the matrix 17 with sheets and the sheets with one another. Also, the mechanical fasteners 224 would ideally increase the strength of the overlap between the matrix members 14. It is anticipated that the fasteners 224 could be impregnated into the matrix members 14 before the matrix 17 is completely cured, such that the matrix members 14 would cure around the fasteners 224.

The mechanical fasteners 224 would preferably extend from below a lower surface of the matrix 17 to above an upper surface of the matrix 17, however alternate embodiments would have the mechanical fasteners 224 flush with the top and the bottom of the matrix 17, or substantively entirely within the matrix 17. The mechanical fasteners 224 could be automatically preloaded into the planar or rotary plates before matrix material 219 is introduced—preferably being received in one of a plurality of transitional or clearance fit sized crevices in the voids at points of overlap of the plates 206, 208 (not shown). Once the matrix 17 is bonded, set, or cured, for example, if desired, the matrix could be removed from the form 202, adhesive could be placed on a top surface and bottom surface of the matrix 17, and then the matrix 17, with the now embedded mechanical fasteners 224 would be placed between two sheets 4, 6. Pressure would then be applied to the two sheets 4, 6, in opposite directions, toward the matrix 17 until the mechanical fasteners 224 engage or pierce the two sheets, and the two sheets 4, 6 engage a respective top or bottom surface of the matrix 17 and the adhesive previously applied. The mechanical fasteners 224 would help maintain the positions of the sheets 4, 6 relative to the matrix 17 as the adhesive cured. Additionally, the mechanical fasteners 224 would add strength to the matrix 17 and the bond between the two sheets 4, 6, strengthen the overall panel 2, and decrease panel 2 manufacturing time.

The mechanical fasteners 224 could have blunt, rounded, sharp, or barbed tips 236 for engaging and grabbing the sheets 4, 6. The tips 236 could be of a length that they extend all the way through the sheets 4, 6 and are then flattened on an opposed surface of the sheet 4, 6 like rivets. The shanks 238 of the mechanical fasteners 224 could be smooth, barbed, helical, or ringed/annular, to help the mechanical fasteners 224 attach to an maintain position in the matrix 17. The mechanical fasteners 224 could have one or multiple cross shaped transverse features 240 that extend into each matrix 17 member transverse to the main shank of the mechanical fastener 224 in an elongate direction of each matrix member 14. The transverse features 240 would increase both the strength of the matrix 17 as a whole, the strength of the points of overlap 216, and the strength of the connection between the bond between the matrix 17 and the sheets 4, 6 and between the sheets 4, 6 with one another. By embedding the mechanical fasteners 224 before the matrix 17 is cured, bonded, or set, the risk in splitting or damaging the matrix 17 by attaching the mechanical fasteners 224 to a solid, set matrix 17 is avoided. Instead, the fasteners 224 are embedded before setting, and the matrix 17 is allowed to cure around the fastener 224, similar to rebar or "cast in place anchor bolts" in concrete. If the matrix 17 was allowed to cure first, such risk of damage would exist, and the ability to utilize transverse features 240 would be much more limited.

As a variation of the pre-cure embedding of mechanical fasteners 224, the sheets 4, 6 may be pre-loaded with fasteners 224 aligned with where the elongate lengths of the respective members 14 will be adjacent to the respective sheets 4, 6. These sheet pre-loaded fasteners 224 would preferably be more simple in design and shorter than the through fasteners 224 above, but, as a benefit, the sheet pre-loaded fasteners 224 could be more numerous, as they could stretch down the length of the adjacent members—for example, as staples down the entire length of a sheet. The sheets, with the pre-loaded fasteners 224, would then be joined with the matrix 17 before the matrix 17 is fully cured so the matrix members 14 are allowed to cure around the mechanical fasteners 224. As with above, adhesives may be used in addition to the mechanical fasteners 224, or the mechanical fasteners 224 may be used with no additional adhesive.

A further embodiment of the mechanical fastens 224, as briefly described above, would use fasteners 224 that are flush with a top and bottom of the matrix 17, or be entirely within the matrix 17. Such has the fasteners 224 would function as an internal reinforcement for the matrix 17, like rebar in concrete. In this embodiment, but the matrix 17 would preferably be connected adhesively and non-mechanically to the sheets 4, 6.

In the above description and appended drawings, it is to be appreciated that only the terms "consisting of" and "consisting only of" are to be construed in the limitative sense while of all other terms are to be construed as being open-ended and given the broadest possible meaning.

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

I claim:

1. A method of forming a ventilated structural panel having a top sheet, a bottom sheet, and a plurality of discrete spacing structural elements arranged in a matrix that fixedly attach the top sheet to the bottom sheet, the method comprising;
    forming the matrix in a mold form, the matrix comprising
        a first layer of the plurality of discrete spacing structural elements extending elongate in a first direction and a second layer of the plurality of discrete spacing structural elements extending elongate in a second direction; and
    attaching the first layer of the plurality of spacing structural elements to the top sheet and the second layer of the plurality of spacing structural elements to the bottom sheet.

2. The method of claim 1 further comprising the step of depositing a matrix material into a plurality of voids formed in a face of one of a first and a second plate of the form and bringing at least a portion of the face of the first plate into contact with the face of the second plate.

3. The method of claim 2 further comprising the step of defining at least a part of a contour of the matrix with the face of one of the first and the second plates and the void.

4. The method of claim 2 further comprising the step of one of a first and the second plate being planar.

5. The method of claim 2 further comprising the step of the first and the second plate being cylindrical.

6. The method of claim 2 further comprising the step of depositing matrix material through form tubes integrated into one of the first plate and the second plate.

7. The method of claim 1 further comprising the step of at least partially setting or curing a matrix material to form the matrix before joining the matrix to the top sheet and the bottom sheet.

8. The method of claim 1 further comprising the step of forming the matrix and the sheets from unitary construction.

9. The method of claim 1 further comprising the step of embedding mechanical fasteners in the matrix before the matrix is fully cured or set.

10. The method of claim 1 further comprising the steps of:
    the first layer of structural spacing elements defining a first plane,
    the second layer of structural spacing elements defining a second plane,
    the first and the second plane being parallel to one another and at least partially offset from one another.

11. The method of claim 1 further comprising the steps of
    the matrix forming a first plurality of parallel air pathways extending from a first edge of the panel to a second opposite edge of the panel,
    the matrix forming a second plurality of parallel air pathways extending from a third edge of the panel to a fourth opposite edge of the panel, and
    the first and the second plurality of parallel air pathways extend orthogonally to one another.

12. The method of claim 1 further comprising the steps of spacing the first layer of structural spacing elements from the second sheet and spacing the second layer of structural spacing elements from the first sheet.

13. The method of claim 1 further comprising the steps of directly attaching the first layer of structural spacing elements to the second layer of structural spacing elements.

14. A method of forming a ventilated structural panel having a top sheet, a bottom sheet, and a plurality of spacing structural elements arranged in a matrix that fixedly attach the top sheet to the bottom sheet, the method comprising:
    forming the matrix in a mold form by depositing a matrix material into a plurality of voids formed in a face of one of a first and a second plate of the form and bringing at least a portion of the face of the first plate into contact with the face of the second plate,
    attaching the matrix to the top sheet and the bottom sheet,
    a first plurality of voids being disposed on one of the first plate and the second plate in a first direction, and
    a second plurality of voids being disposed on one of the first plate and the second plate in a second direction perpendicular to the first direction.

15. The method of claim 14 further comprising the step of both the first and the second plurality of voids being disposed on only one of the first or the second plates.

16. The method of claim 14 further comprising the step of the first plurality of voids being disposed on one of the first plate and the second plurality of voids being disposed on the second plate.

17. A method of forming a ventilated structural panel having a top sheet, a bottom sheet, and a plurality of spacing structural elements arranged in a matrix that fixedly attach the top sheet to the bottom sheet, the method comprising;

forming the matrix in a mold form, the matrix comprising a first plurality of parallel air pathways extending from a first edge of the panel to a second opposite edge of the panel, and a second plurality of parallel air pathways extending from a third edge of the panel to a fourth opposite edge of the panel, and the first and the second plurality of parallel air pathways extend orthogonally to one another, and a third air pathway extending between the top sheet and the bottom sheet, in the interior of the panel, being defined by the matrix; and attaching the matrix to the top sheet and the bottom sheet.

\* \* \* \* \*